United States Patent
Stark

(10) Patent No.: US 9,519,482 B2
(45) Date of Patent: *Dec. 13, 2016

(54) EFFICIENT CONDITIONAL INSTRUCTION HAVING COMPANION LOAD PREDICATE BITS INSTRUCTION

(71) Applicant: Netronome Systems, Inc., Santa Clara, CA (US)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 14/311,225

(22) Filed: Jun. 20, 2014

(65) Prior Publication Data

US 2015/0370562 A1   Dec. 24, 2015

(51) Int. Cl.
G06F 9/30   (2006.01)
G06F 9/38   (2006.01)

(52) U.S. Cl.
CPC ....... *G06F 9/30069* (2013.01); *G06F 9/30145* (2013.01); *G06F 9/3802* (2013.01)

(58) Field of Classification Search
None
See application file for complete search history.

(56) References Cited

U.S. PATENT DOCUMENTS

| 5,434,986 A * | 7/1995 | Kuslak | G06F 9/3806 712/216 |
| 5,471,593 A * | 11/1995 | Branigin | G06F 9/30018 712/219 |
| 5,931,940 A * | 8/1999 | Shelton | G06F 9/30018 712/204 |
| 6,009,512 A * | 12/1999 | Christie | G06F 9/30072 712/218 |
| 6,094,718 A * | 7/2000 | Tanaka | G06F 9/30018 700/2 |
| 7,836,289 B2 * | 11/2010 | Tani | G06F 9/30072 712/234 |
| 2005/0066151 A1 * | 3/2005 | Kottapalli | G06F 9/30072 712/226 |
| 2006/0224867 A1 * | 10/2006 | Tran | G06F 9/30072 712/226 |
| 2009/0204785 A1 * | 8/2009 | Yates, Jr. | G06F 9/30174 711/205 |

(Continued)

*Primary Examiner* — Eric Coleman
(74) *Attorney, Agent, or Firm* — Imperium Patent Works LLP; T. Lester Wallace; Mark D. Marrello

(57) ABSTRACT

A pipelined run-to-completion processor can decode three instructions in three consecutive clock cycles, and can also execute the instructions in three consecutive clock cycles. The first instruction causes the ALU to generate a value which is then loaded due to execution of the first instruction into a register of a register file. The second instruction accesses the register and loads the value into predicate bits in a register file read stage. The predicate bits are loaded in the very next clock cycle following the clock cycle in which the second instruction was decoded. The third instruction is a conditional instruction that uses the values of the predicate bits as a predicate code to determine a predicate function. If a predicate condition (as determined by the predicate function as applied to flags) is true then an instruction operation of the third instruction is carried out, otherwise it is not carried out.

20 Claims, 20 Drawing Sheets

PIPELINED RUN-TO-COMPLETION PROCESSOR

(56) References Cited

U.S. PATENT DOCUMENTS

2012/0204007 A1\* 8/2012 Reid ................... G06F 9/30069
                                                    712/208
2013/0227251 A1\* 8/2013 Gonion ............... G06F 9/30058
                                                    712/216

\* cited by examiner

MANY SMALL SECTIONS OF SPECIALIZED CODE

ONE SECTION OF CODE

OCTETS IN ONE 128-BIT BLOCK OF INFORMATION

FETCH INSTRUCTION WHERE THE OFFSET IS A VALUE IN THE INITIAL FETCH INFO

FETCH INSTRUCTION WHERE THE OFFSET IS
A VALUE IN THE INPUT DATA VALUE

FETCH INSTRUCTION WHERE THE OFFSET
VALUE IS IN A SPECIFIED REGISTER

FETCH THE NEXT 128-BIT BLOCK OF INSTRUCTIONS AFTER THE LAST INSTRUCTION FETCHED.
THE MEMORY IS THE SAME MEMORY FROM WHICH THE LAST INSTRUCTION WAS FETCHED.

FETCH MORE INSTRUCTION

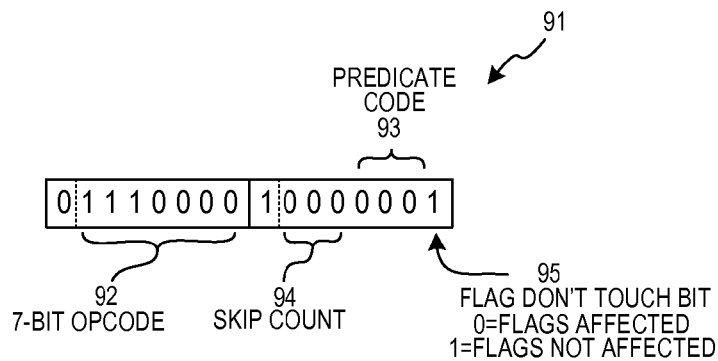

SKIP INSTRUCTION THAT SPECIFIES A SKIP COUNT AND
A PREDICATE FUNCTION

FIG. 9

| P | P | P | DESCRIPTION |
|---|---|---|---|
| 0 | 0 | 0 | ZERO FLAG IS SET |
| 0 | 0 | 1 | ANY FLAG IS SET |
| 0 | 1 | 0 | CARRY FLAG IS SET AND ZERO FLAG IS CLEAR |
| 0 | 1 | 1 | ALWAYS |
| 1 | 0 | 0 | NOT (ZERO FLAG IS SET) |
| 1 | 0 | 1 | NOT (ANY FLAG IS SET) |
| 1 | 1 | 0 | NOT ( CARRY FLAG IS SET AND ZERO FLAG IS CLEAR) |
| 1 | 1 | 1 | NOT (ALWAYS) |

PREDICATE CODES INDICATED BY THE PREDICATE BITS

FIG. 10

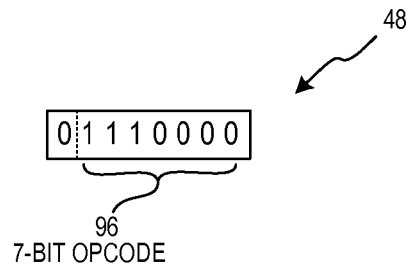

USES P BITS IN THE REGISTER FILE READ STAGE TO SPECIFY THE PREDICATE FUNCTION.

SINGLE-OCTET SKIP INSTRUCTION

FIG. 11

LOAD REGISTER FILE READ STAGE CONTROL
REGISTER INSTRUCTION

LOAD DECODE STAGE CONTROL REGISTER
INSTRUCTION

FINISHED INSTRUCTION

STATE DIAGRAM OF THE CLOCK CONTROL
AND PIPELINE CONTROL STATE MACHINE

TABLE NUMBER TO BASE ADDRESS
LOOKUP TABLE CIRCUIT

FETCH REQUEST STAGE

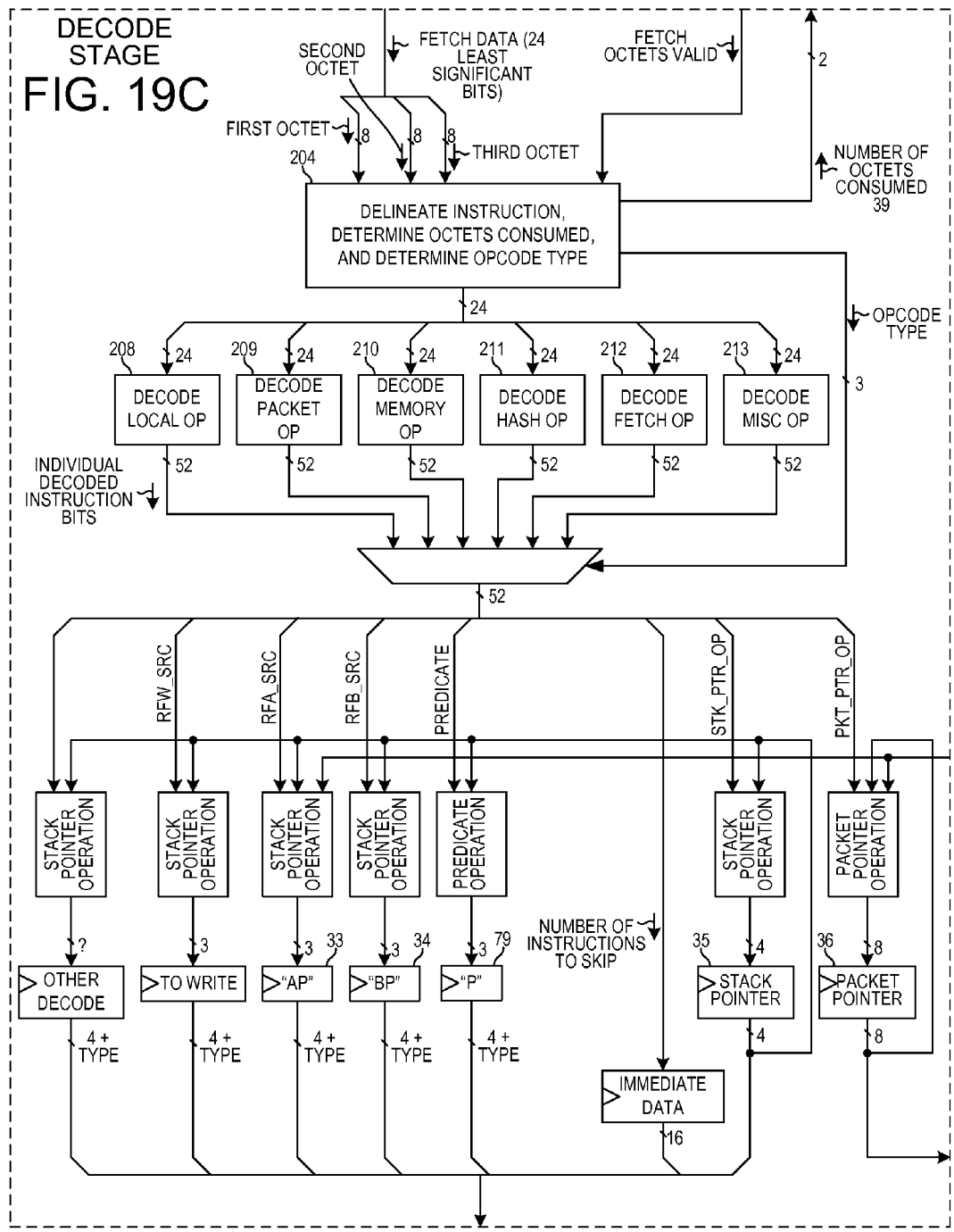

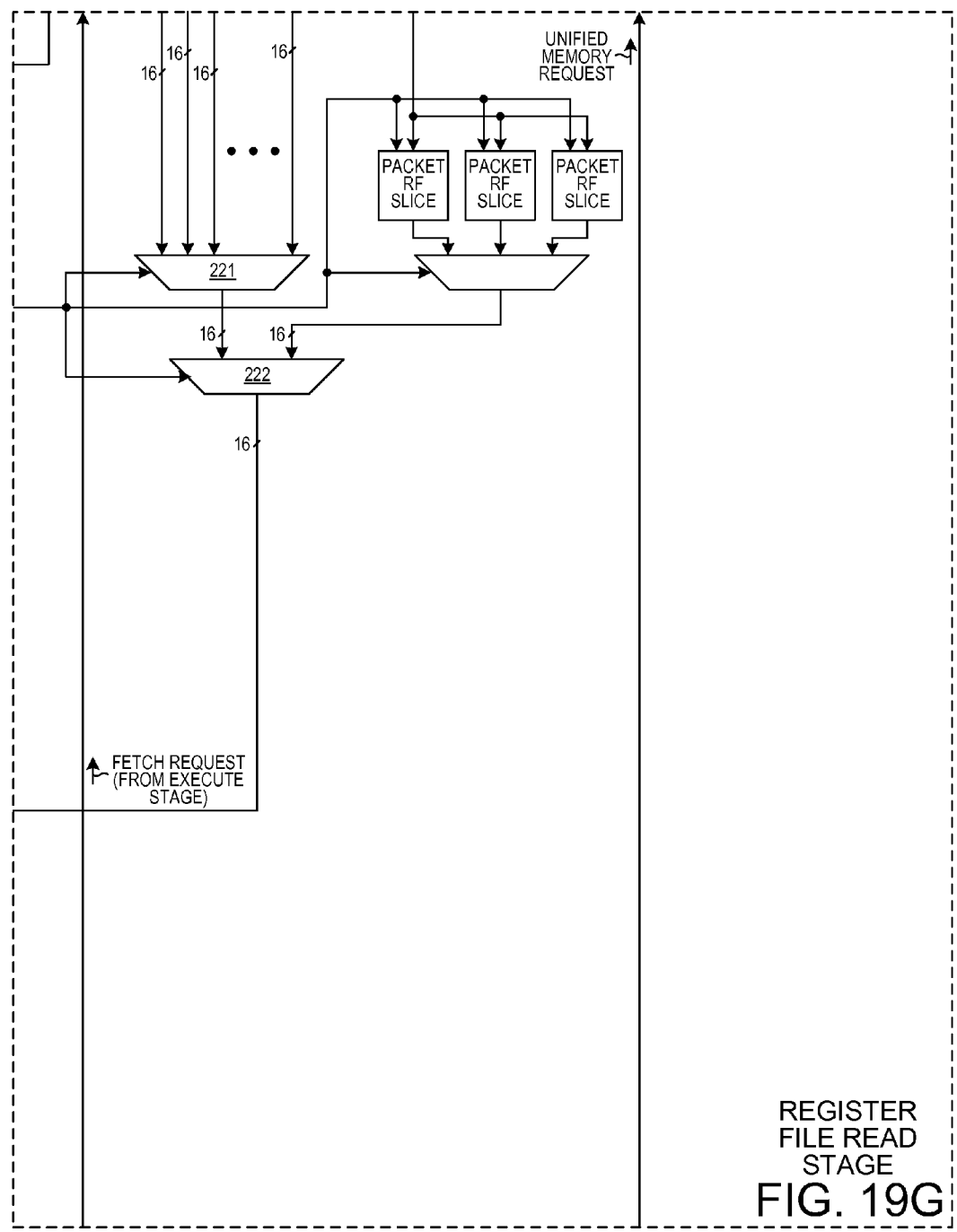

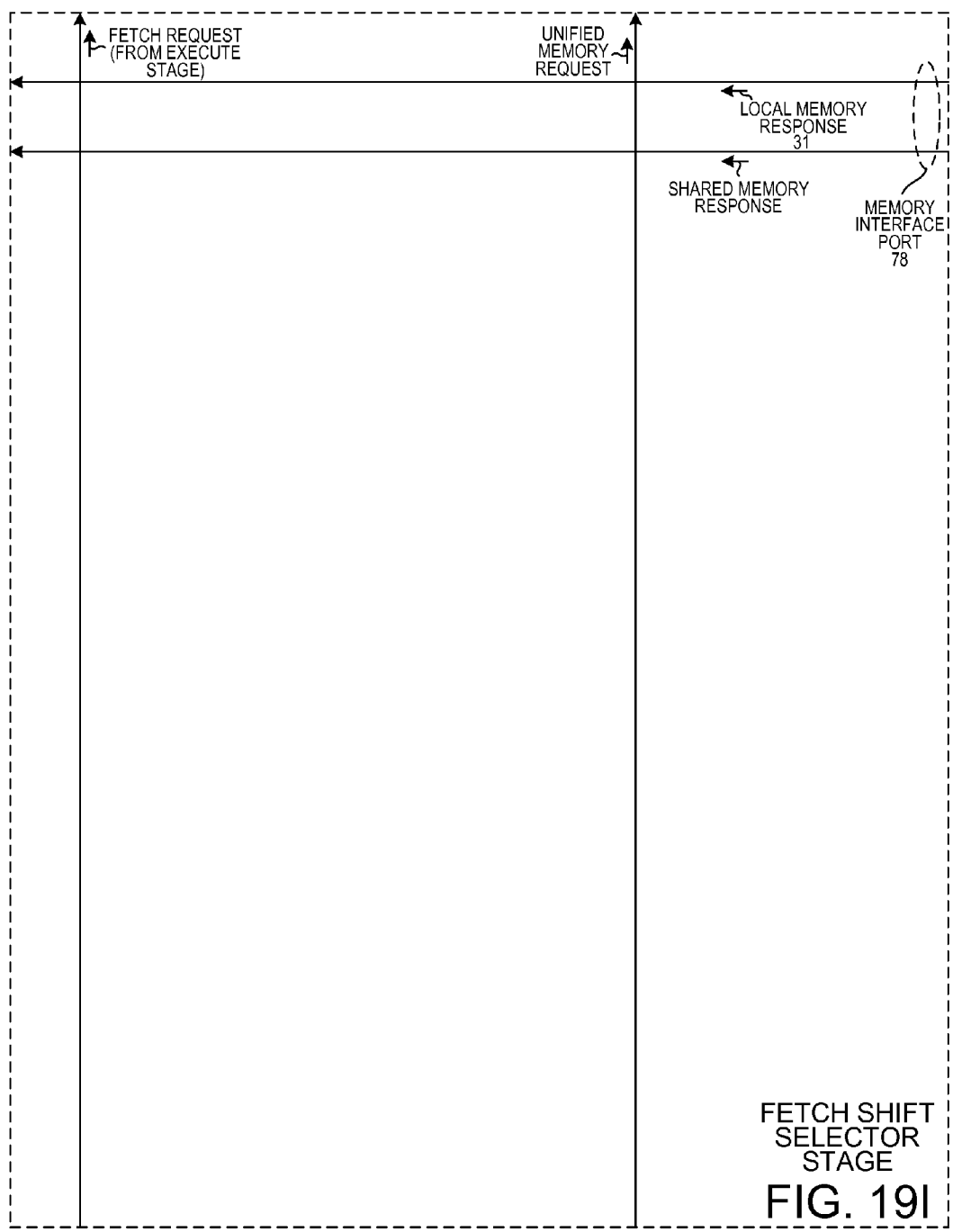

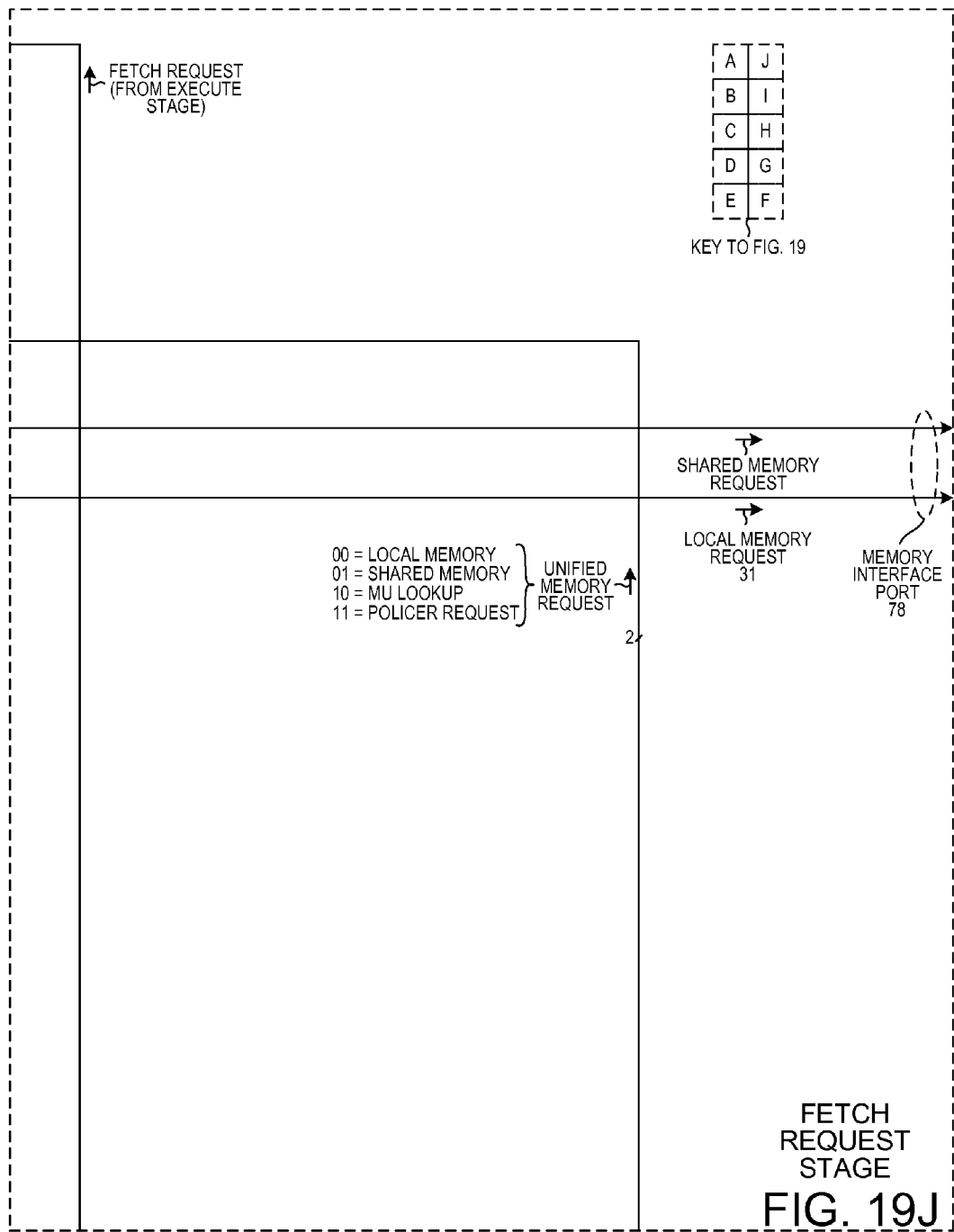

SHIFT DOWN BY AND
ADD NO-OP CIRCUIT

EFFICIENT CONDITIONAL INSTRUCTION HAVING COMPANION LOAD PREDICATE BITS INSTRUCTION

TECHNICAL FIELD

The described embodiments relate generally to a conditional skip instruction and a companion load predicate instruction that execute on a pipelined run-to-completion processor, where execution of the skip instruction does not involve any use of any instruction counter.

REFERENCE TO ASCII TEXT FILE APPENDIX

This application includes an ASCII text file appendix containing source code to software that embodies the inventions described herein. The software code is a hardware description language header file for one embodiment of the picoengine. The header file describes the contents of control buses and control signals within the picoengine. The hardware description language is CDL. The source code is in ASCII format. A portion of the disclosure of this patent document contains material that is subject to copyright protection. All the material on the ASCII text file appendix is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights. The ASCII text file appendix includes one text file readable in the MS-Windows operating system. The file is named "Picoengine_Header_File_Code.txt", is 12.1 kilobytes large, and was created on May 31, 2012.

SUMMARY

A pipelined run-to-completion processor includes no instruction counter and only fetches instructions either: as a result of being prompted from the outside by an incoming input data value and/or an incoming initial fetch information value, or as a result of execution of a fetch instruction. Due to the lack of an instruction counter and the associated control circuitry which can be substantial, the pipelined run-to-completion processor can be realized in a small amount of integrated circuit area. In one example, the pipelined run-to-completion processor is implemented in about ten thousand equivalent gates. The processor includes a pipeline, and the pipeline includes a fetch stage, a fetch shift selector stage, a decode stage, a register file read stage, and an execute stage.

In one novel aspect, the processor fetches a sequence of instructions, including a first instruction and a second instruction. The first instruction is a skip instruction. The skip instruction is decoded first by the decoder stage, and then the second instruction is decoded by the decoder stage. If a predicate condition as specified by a predicate field of the skip instruction is true, then execution of the skip instruction causes a number of instructions following the skip instruction in the sequence to be "skipped". The number of instructions skipped is specified by a multi-bit skip count field of the skip instruction. In one example, the predicate condition is a function of the values of flag bits (for example, a carry flag and a zero flag) stored in the register file read stage, where the function is specified by the value of the multi-bit predicate field of the skip instruction. If the second instruction is skipped then the second instruction is nevertheless still decoded in the decoder stage, but when processing of the second instruction proceeds to the execute stage the execute stage is disabled from carrying out the instruction operation of the second instruction to be skipped. In this way, execution of one or multiple instructions can be skipped.

In one example, the skip instruction also has a "flag don't touch" bit. If this "flag don't touch" bit in the skip instruction is set, then neither the skip instruction nor any skipped instructions can change the values of the flags. If, on the other hand, this "flag don't touch" bit is not set, then skip instruction and any skipped instruction can change the value of the flags. In one exemplary usage of the skip instruction, initial instructions in the sequence of instructions set the flag bits to particular values. The skip instruction then is decoded and executed. Whether the predicate condition of the skip instruction is true depends on the flag bits having certain predetermined values. If when the skip instruction is decoded the predicate condition is true, then a number of instructions following the skip instruction are skipped. In one novel aspect, each of the skipped instructions can also be predicated on the very same values of the flags (as seen by the preceding skip instruction). The skipped instructions use the values of the flags, and may be predicated based on their values, but execution of a skipped instruction does not change the values of the flags. In one example, the predicate condition of the skip instruction does not depend on the contents of a register of the register file having any particular value, but rather the predicate condition is only dependent upon the values of the flags.

Unlike a conventional conditional branch instruction, the novel predicated skip instruction can cause a skip to a next instruction to be executed, where the next instruction to be executed may have already been fetched and may already have started passing through the pipeline. If the skip instruction is true, then the execute stage of the pipeline is simply momentarily disabled when an instruction to be skipped passes through the execute stage. Unlike a conventional conditional branch instruction, no instruction counter is employed to engage in a prompted fetch as a result of execution of the branch instruction. Unlike a conventional conditional branch instruction, the skip instruction does not cause a fetch of the next instruction to be executed (if the skip is taken) after the determination is made to skip, but rather the instruction that is to be executed next (after the skip) has already been fetched when the skip instruction is decoded.

In a second novel aspect, the pipelined run-to-completion processor can decode three instructions in three consecutive clock cycles, and can also execute the three instructions in three consecutive clock cycles. The first instruction causes the ALU to generate a value which is then loaded due to execution of the first instruction into a register of a register file. The second instruction accesses the register and loads the value into predicate bits in a register file read stage. The predicate bits are loaded in the very next clock cycle following the clock cycle in which the second instruction was decoded. The third instruction is a conditional instruction that uses the values of the predicate bits as a predicate code to determine a predicate function. If a predicate condition (as determined by the predicate function as applied to flags) is true then an instruction operation of the third instruction is carried out, otherwise the instruction operation of the third instruction is not carried out. In one specific example, the third instruction is an efficient single-octet skip instruction that does not explicitly specify the predicate code, nor does it include a skip count field that explicitly specifies a number of instructions to skip. There may be multiple such single-octet efficient instructions in sequence, where all of these instructions use the same predicate code as specified by the predicate bits, and where none of these instruction explicitly sets forth any predicate code bit values.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 9 is a diagram of a skip instruction that specifies a skip count and a predicate function.

FIG. 10 is a table illustrating the meaning of predicate bits in the instruction of FIG. 9.

FIG. 11 is a diagram of a single-octet skip instruction.

FIG. 19A is a diagram of a part of a larger diagram of FIG. 19, wherein FIG. 19 is a diagram of a specific example of the pipeline 7 of the processor of FIG. 1.

FIG. 19C is a diagram of a part of a larger diagram of FIG. 19.

FIG. 19G is a diagram of a part of a larger diagram of FIG. 19.

FIG. 19I is a diagram of a part of a larger diagram of FIG. 19.

FIG. 19J is a diagram of a part of a larger diagram of FIG. 19.

DETAILED DESCRIPTION

Reference will now be made in detail to background examples and some embodiments of the invention, examples of which are illustrated in the accompanying drawings.

Figure 1:
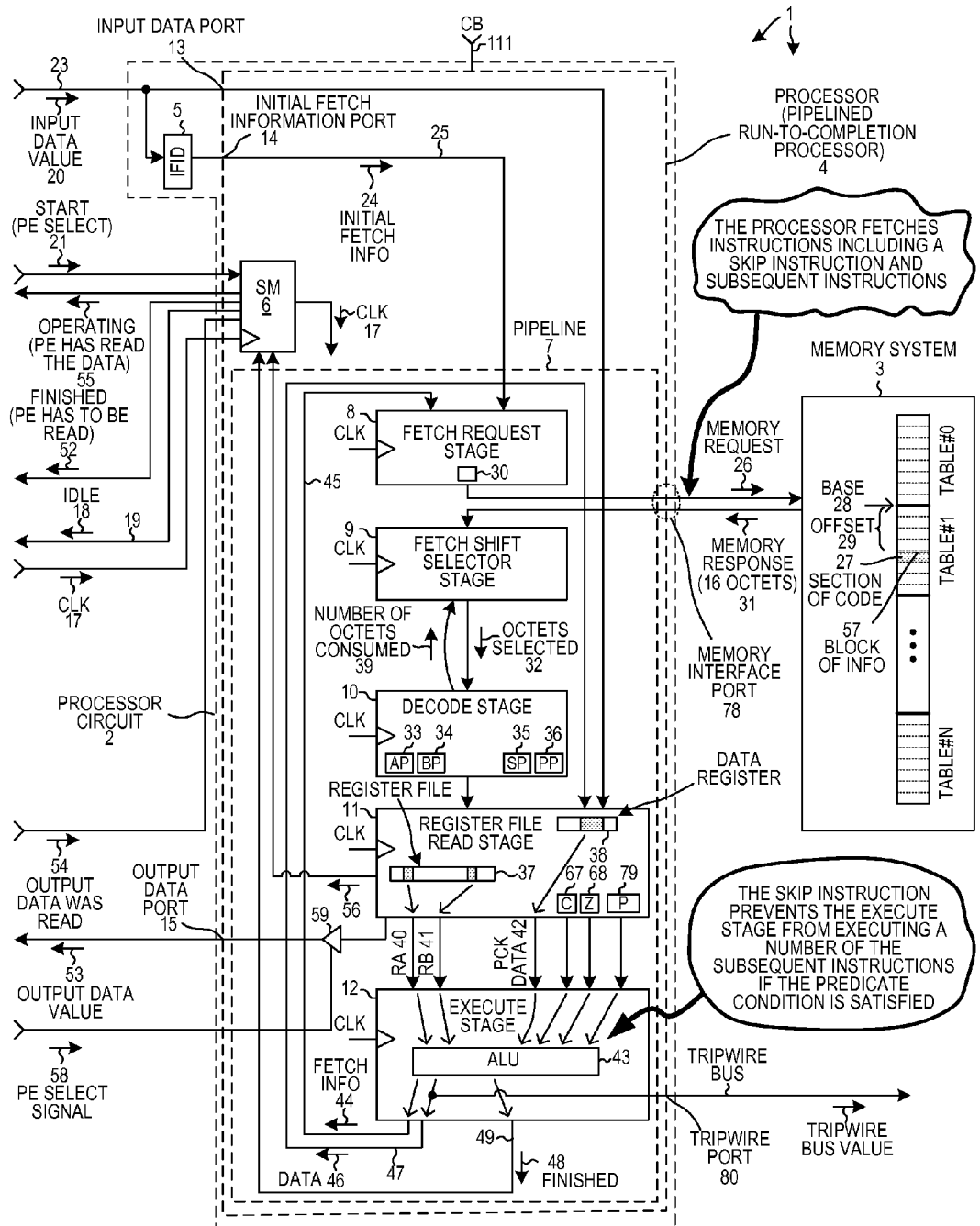
FIG. 1 is a diagram of system 1 involving a pipelined run-to-completion processor 4 in accordance with one novel aspect.

FIG. 1 is a high-level block diagram of a system 1 including a processor circuit 2 and a memory system 3 in accordance with one novel aspect. The processor circuit 2 includes a pipelined run-to-completion processor 4 and an initial fetch information determination circuit 5. The pipelined run-to-completion processor 4 includes a clock control state machine 6 and a pipeline 7. The pipeline 7 includes a fetch request stage 8, a fetch shift selector stage 9, a decode stage 10, a register file read stage 11, and an execute stage 12. The pipelined run-to-completion processor 4 receives input data values from an external circuit via input data port 13, and receives initial fetch information values via initial fetch information port 14, outputs output data values to an external circuit via output data port 15, interfaces to memory system 3 via a memory interface port 78, outputs tripwire data via a tripwire port 80.

Figure 15:
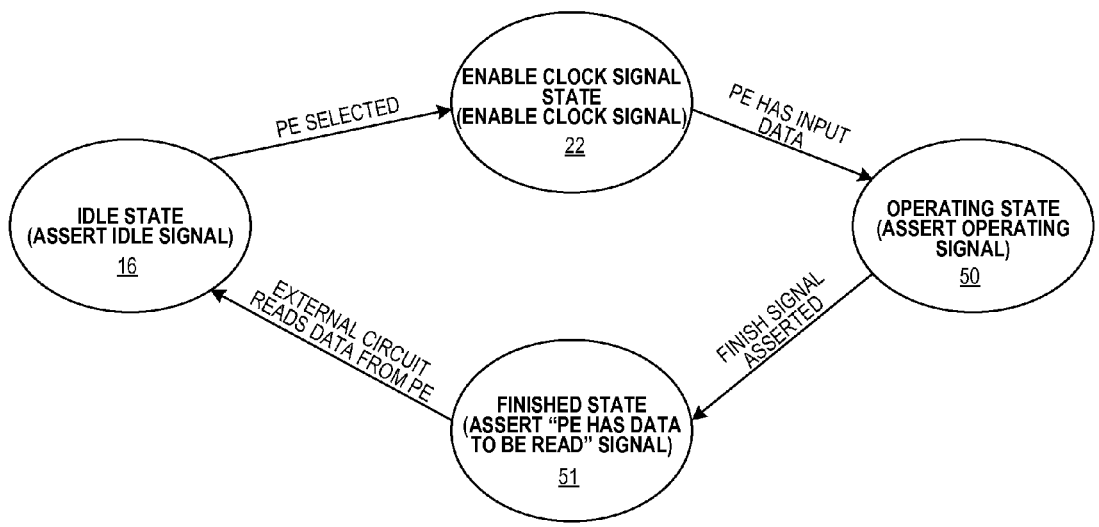
FIG. 15 is a state diagram for the clock control state machine 6 of the processor 4 of FIG. 1.

Initially, the state machine 6 is in the idle state 16 (see that state diagram of FIG. 15). The pipeline 7 is clocked by the clock signal CLK 17. In the idle state, the state machine 6 disables the clock signal CLK from clocking the pipeline 7. The pipeline 7 is therefore not being clocked, and power consumption of the processor 4 is reduced. In the idle state, the state machine 6 also outputs the idle signal 18 via conductor 19. If the processor is idle, an external circuit external to the processor then supplies an input data value 20 onto the input data port 13 of the processor and asserts the start signal 21 (also referred to as the "PE select signal"). The input data port 13 in this case is a set of conductors 23 that extends from outside the processor and to the register file read stage 11. The asserting of the start signal 21 informs the processor 4 that the input data value 20 on the input data port 13 is available to be read. In response to the assertion of the start signal 21, the state machine 6 transitions to the enable clock signal state 22 (see the state diagram of FIG. 15).

The transition of the state machine 6 to the enable clock signal state 22 enables the pipeline 7 by supplying the clock signal CLK 17 to the pipeline 7. At the same time that the input data value 20 is being supplied to the processor via conductors 23 and the input data port 13, an initial fetch information value 24 is also being supplied to the processor 4 via conductors 25 and initial fetch information port 14. In the present example, the initial fetch information determination circuit 5 includes a characterizer circuit and a Ternary Content Addressable Memory (TCAM). The characterizer is an amount of combinatorial logic that receives the input data value, characterizes various parts of the input data value, and generates therefrom a set of flag values. The value of a particular flag as output by the characterizer indicates whether the input data value 20 has a corresponding particular characteristic. If, for example, the input data value 20 is an IPv4 network packet, then this characteristic is detected by the characterizer and the characterizer assert an IPv4 flag (the IPv4 flag is set), otherwise the characterizer does not assert the IPv4 flag (the IPv4 flag is cleared). There are many flags output by the characterizer, with each different flag indicating whether the input data value has a corresponding different characteristic. The flags as output by the characterizer are supplied to inputs of the TCAM. Depending on the values of the flags determined from the input data value 20, the TCAM outputs a multi-bit value (referred to as the "input fetch information value") onto the initial fetch information port 14 of the processor circuit 2.

The fetch request stage 8 generates memory requests that are supplied to the external memory system 3 via memory interface port 78. The fetch request stage 8 can only output a memory request in response to either: 1) an incoming input data value and/or an incoming initial fetch information value, or 2) a fetch information value supplied to the fetch request stage as a result of execution by the pipeline of a fetch instruction. In the present example, both an incoming input data value is being supplied to the pipeline as well as an associated initial fetch information value. The incoming input data value 20 and/or initial fetch information value 24 prompts the pipeline 7 to issue a memory request 26. The memory request 26 is communicated to the external memory system 3. As explained in further detail below, the memory request 26 is a request to read one 128-bit word 57 from the memory system, where the address of the 128-bit word 57 is given by a base address value 28 and an offset value 29. The 128-bit word 47 is located at the beginning of a section 27 of code. A 128-bit word is also referred to here as a "block of information". The memory of the memory system 3 is organized as a set of uniquely addressable 128-bit words. The base address value identifies the beginning of a table, TABLE#1 in this case, of code. The offset value identifies an offset from the base address 28 at the beginning of the table to the beginning of the section 27 of code. The external memory system 3 stores many such tables of code. The tables in FIG. 1 are denoted TABLE#0, TABLE#1, to TABLE#N.

In one specific example, the particular section 27 of code that the processor is prompted to fetch within table TABLE#1 depends on the initial fetch information value 24. The particular table as well is determined by the initial fetch information value 24. The initial fetch information value 24 includes a table number value. The fetch request stage 8 includes a table number to base address lookup circuit 30. The table number value is supplied to the lookup table circuit 30, and the lookup table circuit 30 outputs the base address value for the table. The base address value is then incorporated into the actual memory request 26.

The memory system 3 responds by returning to the processor circuit 2 a memory response 31. The memory response 31 includes one 128-bit block of information at the beginning of the identified section 27 of code. The 128-bit block of information 57 contains sixteen octets. The 128-bit block of information 57 includes a plurality of instructions, where an instruction can involve one, two or three octets, depending on the type of instruction. The number of instructions in a 128-bit block is therefore variable. The 128-bit block of information 57 is received by the fetch shift selector stage 9. The fetch shift selector stage 9 stores the 128-bit block of information 57, and then outputs three octets to the decode stage 10, where the particular octets output include the next instruction to be consumed next by the pipeline. Immediately after the fetch of the 128-bit block 57, it is the first, second and third octets of the 128-bit block that are output from the fetch shift selector stage 9.

The decode stage 10 receives the selected octets 32, and decodes the instruction. Based on the instruction, the decode stage 10 loads an A register pointer AP 33, a B register pointer BP 34, a carry flag bit C 67, a zero flag bit Z 68, a stack pointer SP 35, a packet pointer PP 36, and predicate bits P 79. The A register pointer AP 33 identifies one register (8-bit portion) of a register file 37 in the register file read stage 11. This identified 8-bit portion contains the value of the A register for the instruction to be executed. The B register pointer BP 34 identifies another register (8-bit portion) of the register file 37 that contains the value of a B register for the instruction to be executed. The stack pointer SP 35 identifies one register (8-bit portion) of the register file 37 that is the top of the stack. The 8-bit portions of the register file are usable as a stack, and there are instructions in the instruction set of the processor that use the stack. The packet pointer PP 36 identifies one bit in the input data register 38 in the register file read stage 11, where the bit is the first bit of a multi-bit value that may be used in the instruction to be executed. The predicate bits P 79 are three-bits that may be used by an instruction to specify a predicate condition function. In addition to determining these pointer values, the decode stage 10 sends a "number of octets consumed signal" 39 back to the fetch shift selector stage 9. The number of octets consumed depends on the instruction just consumed. If the instruction just consumed involves only one octet, then the decode stage 10 informs the fetch shift selector stage 9 to shift the bits the fetch shift selector stage outputs by one octet. If the instruction just consumed involves two octets, then the decode stage 10 informs the fetch shift selector stage 9 to shift the bits the fetch shift selector stage outputs by two octets. If the instruction just consumed involves three octets, then the decode stage 10 informs the fetch shift selector stage 9 to shift the bits the fetch shift selector stage outputs by three octets. Which octets of the block of information 57 that are output by the fetch shift selector stage 9 are therefore determined by the decode stage 10 using the number of octets consumed signal 39.

The register file read stage 11 stores the input date value 20 into the input data register 38, and sends a signal 56 back to the state machine 6, thereby causing the state machine 6 to transition from the enable clock signal state 22 to the operating state 50 (see the state diagram of FIG. 15). The state machine 6 signals the external circuit that the processor circuit 2 has received the input data value 20 by outputting an operating signal 55. The external circuit can then stop driving input data value 20 onto the input data port 13.

The register file read stage 11 uses the pointer values 33 and 34 from the decode stage to identify the portions of the register file 37 that store the A register value RA 40, and store the B register value RB 41. The register file read stage 11 uses the packet pointer value 36 from the decode stage to identify the portion of the input data register 38 that stores the PCK data value 42 to be used by the instruction. The contents of the register file 37 are output from the register file read stage 11 to the output buffers 59, but the output buffers 59 are disabled. The contents of the register file 37 are therefore not driven onto the output data port 15.

The execute stage 12 receives the RA value 40 (the contents of the A register), the RB value 41 (the contents of the B register) and the PCK data value 42 from the register file read stage 11. These values are inputs to an ALU 43 (Arithmetic Logic Unit) in the execute stage 12. The instruction operation to be performed, using these values, is determined by control signals (not shown) received from the decode stage 10, where the instruction operation is determined by the opcode of the instruction. The instruction set of the processor includes several different types of instructions including: ALU instructions, memory access instructions for data, instruction fetch instructions, and processor control instructions. Some of the instructions use the packet pointer 36 and the input data register 38 so that the instruction can obtain and use a part or parts of the input data value 20. Although not illustrated in FIG. 1, there is also another pointer and another register, where the other register stores the initial fetch information value 24. Other instructions use this pointer and this other register to obtain and use a part or parts of the initial fetch information value 24. In addition, flags are included into the input data value 20 as stored in the input data register 38, so these flags are also available for reference by instructions executed by the processor circuit 2. After an instruction has been consumed by the decode stage of the pipeline, the next instruction in the fetched block of information is supplied to the decode stage. The instructions of the fetched block of instructions are supplied to the decoder and are decoded one by one.

If the execute stage is executing a fetch instruction, then the execute stage supplies fetch information 44 back to the fetch request stage 8 via conductors 45. The execute stage also supplies associated data 46 via conductors 47. In the same way that an externally prompted fetch is prompted by fetch information received on initial fetch information port 14 and input data value received on input data port 13, so too is an internally prompted fetch from the execute stage 12 prompted by fetch information 44 on conductors 45 and data 46 on conductors 47.

As stated above, once the pipeline is operating it does not and cannot fetch instructions unless either: 1) it is prompted to by the receipt of another input data value (and associated initial fetch information value) or, 2) it is prompted to by execution of a fetch instruction. If the processor executes the last instruction of the fetched block of information and there is not a next instruction that has already been fetched, then the processor would hang. Accordingly, in the present example, the last instruction of the fetched block of information 57 is another fetch instruction. This last fetch instruction causes the processor to fetch the next 128-bit block of information from the same section 27 of code. The processor then continues on executing instructions from this second 128-bit block of information. The section 27 of code has a particular function. At the end of the code for performing this function is another fetch instruction, but this fetch instruction is an instruction to fetch the next 128-bit block of information from another table. In this way, the code executed by the processor is modular, with the code of one table causing a fetch into the code of another table, and so forth, from table to table. When fetching into the next table, the offset into the table is typically determined by a characteristic of the input data value 20, as recorded by flags generated by the characterizer. In some embodiments, the flags as determined by the characterizer are incorporated into the input data value 20 as stored in the input data register 38. When execution jumps from one table to the next, the particular section of code that is specifically tailored to data having a characteristic is vectored to (as opposed to vectoring to another section of the table whose code is not for data having the characteristic) due to the fetch instruction having access to the flags.

After the functions of the code have been carried out and execution of the code has traversed from table to table, a final "finished instruction" is executed. Execution of the finished instruction causes the execute stage 12 to assert a finished signal 48 on conductor 49. Asserting of the finished signal 48 causes the state machine 6 to transition from the operating state 50 to the finished state 51 (see the state diagram of FIG. 15). In the finished state 51, the state machine 6 asserts a finished signal 52 that is output from the processor circuit 2. The finished signal 52 as output from the processor circuit 2 is also referred to as the "PE has data to be read" signal. Assertion of the finished signal 52 indicates to an external circuit that the processor circuit 2 has data to supply to the external circuit. In response to the assertion of the "PE has data to be read" signal 52, the external circuit enables the outputting of the data output value 53 onto output data port 15 by asserting a "PE select signal" 58. Assertion of the PE select signal 58 causes the output buffers 59 to be enabled. The buffers 59 then drive the contents of the register file 37 onto the output data port 15 and to the external circuit. Execution of the finished instruction also causes the state machine 6 to stop the clock signal CLK from being supplied to the pipeline. The pipeline therefore stops clocking, and power consumption is reduced.

While the PE select signal 58 is asserted and the output data value 53 is being driven onto the output data port 15, the external circuit reads the output data value 53 from the output data port 15. The external circuit then deasserts the PE select signal 58 thereby disabling driver 59, and asserts an "output data was read" signal 54. Assertion of the "output data was read signal" 54 causes the state machine 6 to transition to the idle state 16. In the idle state 16, the state machine asserts the idle signal 18. At this point, the pipeline is not being clocked, but it is ready to receive another input data value and another associated initial fetch information value.

Figure 2:
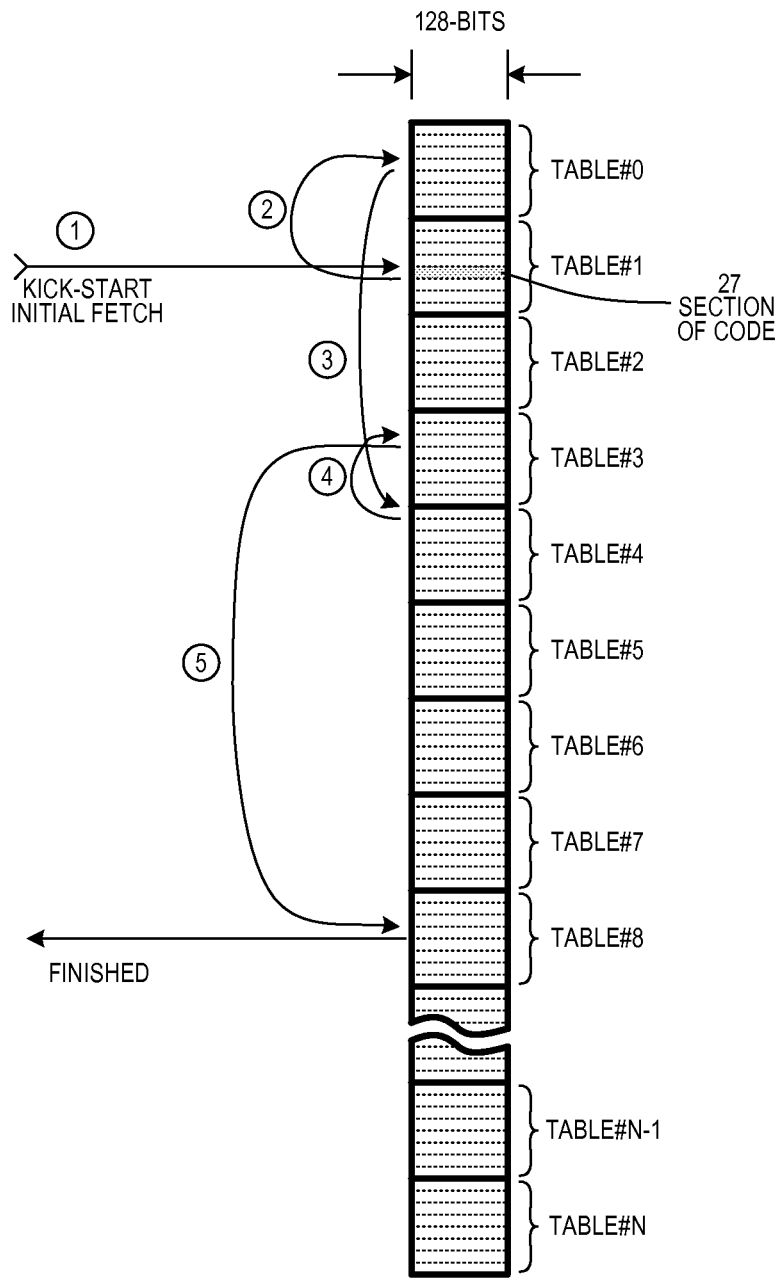
FIG. 2 is a diagram of the tables of code stored in the external memory system 3 of FIG. 1.

FIG. 2 is a diagram of the program code stored in the external memory 3. The memory is organized as many uniquely addressable 128-bit blocks of information. There are many such 128-bit blocks of information in one section of code, and there are many sections of code in one table, and there are N tables stored in the memory. In the illustrated example, the initial fetch (the one initially prompted from outside the processor by incoming data) is identified by the circled numeral "1". The incoming initial fetch information causes the pipeline to start clocking. The resulting first fetch from the external memory has a base address 28 that identifies the first word 57 (first 128-bit block) of TABLE#1. The table number given by the initial fetch information value 24 is translated by the lookup table circuit 30 into the base address value 28 that is then used in the memory request 26. The offset 29 from the beginning location of TABLE#1 identifies the beginning 128-bit block 57 of section 27 of code. This offset 29 is specified by the initial fetch information. Once all the blocks of this section 27 of code have been executed, a fetch instruction causes code execution to jump to the fourth section of TABLE#0. This is identified in FIG. 2 by the circled numeral "2". After execution of this section of code, a fetch instruction causes code execution to jump to the first section of the code of TABLE#4. This is identified in FIG. 2 by the circled numeral "3". The instruction fetches that causes the fourth and fifth jumps are identified in FIG. 2 by the circled numerals "4" and "5". At the end of the fourth section of code of TABLE#8 is a "finished" instruction. This finished instruction causes the pipeline to stop clocking, and causes the external circuit to be signaled that the processor circuit 2 has an output data value 53 to be read on output data port 15.

Each section of code is typically an amount of code that is specialized to do a particular discrete task on input data having a particular characteristic or characteristics. In one simplified illustrative example, a first section of code does VLAN and MAC address processing, a second section of code does IP header analysis processor, a third section of code does tunnel decapsulation processing, and a fourth section of code does inner header processing. Execution of a fetch instruction at the end of the first section references an IP header version flag (a flag in the initial fetch information value 24 that indicates whether packet data is IPv4 or IPv6), and as a result of this flag fetches code at the beginning of the second section. Execution of a fetch instruction at the end of the second section references a header value in the input data value 20 (the header value indicates whether the packet is a tunnel packet, and if so what kind of tunnel), and as a result of this header value fetches code at the beginning of the third section. Execution of a fetch instruction at the end of the third section references a set of data values stored in memory system 3 (the set of data values indicates whether the packet data is an ethernet frame or an IP packet), and as a result of this set of data values fetches code at the beginning of the fourth section. Another processor (a microengine (ME) processor not shown) preloads the set of data values into the memory system 3 so that the set of data values is later usable by picoengine (PE) processor circuit 2 executing a fetch instruction to determine which section of code to execute next. Memory system 3, in addition to storing blocks of information of code, stores many such sets of data values.

In one example, the processor circuit 2 of FIG. 1 is one of many such identical processor circuits (also referred to picoengines or "PEs") in a pool (also referred to as a picoengine pool). The PE processor circuits are supplied with data and are assigned tasks, one by one, in a particular order. If a processor circuit of the pool is assigned a task, then it performs the task until it has a resulting output data value. An individual processor circuit that has an output data value (for example, output data value 53 of FIG. 1) to be read then holds its output data value until the output data value is read from the processor circuit. The resulting output data values from the PE processor circuits are read out of the pool one by one, in the very same order in which tasks were assigned, and the resulting data values are stored in an external FIFO. To perform this reading of the data values from the pool, an external output data reader circuit supplies a PE select signal to each of the PE processor circuits, but it only asserts one PE select signal going to one PE processor circuit at a time. The currently selected PE processor circuit is made to output its output data value onto a common output bus, and the output data value is communicated via this bus to the FIFO. After the output data value is stored in the FIFO, the output data reader circuit deasserts the PE select signal and asserts another PE select signal, so that another of the PE processor circuits will then output its output data value onto the common output bus. In this way the output data values from PE processor circuits are read, one by one. Each output data value includes a buffer pool number value that indicates a particular processor (an ME microengine processor) that will perform further processing on the data. A first particular type of input data values will typically be further processed by a first ME processor, whereas a second particular type of input data values will typically be further processed by a second ME processor, and so forth. The buffer pool numbers in the output data values are used to control which of the subsequent processing ME processors will further process which output data values being output from the pool. For additional information on a picoengine pool and an output data reader, see: U.S. patent application Ser. No. 14/251,592, entitled "Picoengine Multi-Processor With Task Management", filed Apr. 12, 2014, by Gavin J. Stark (the entire subject matter of which is incorporated herein by reference).

Figure 3:
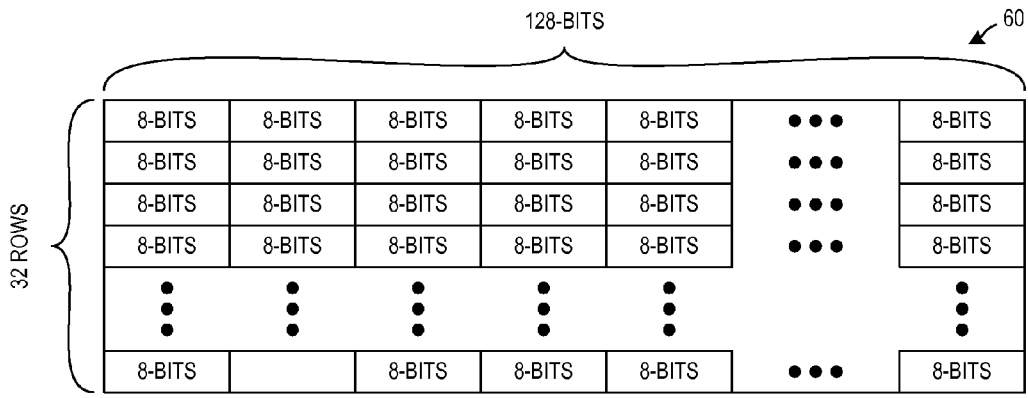
FIG. 3 is a diagram of one section of code in the external memory system of FIG. 1.

FIG. 3 is a diagram of one section 60 of code. Each 128-bit block of information (one row in the diagram) includes 16 octets. In this example, there are thirty-two 128-bit blocks of information in the section 60.

Figure 4:
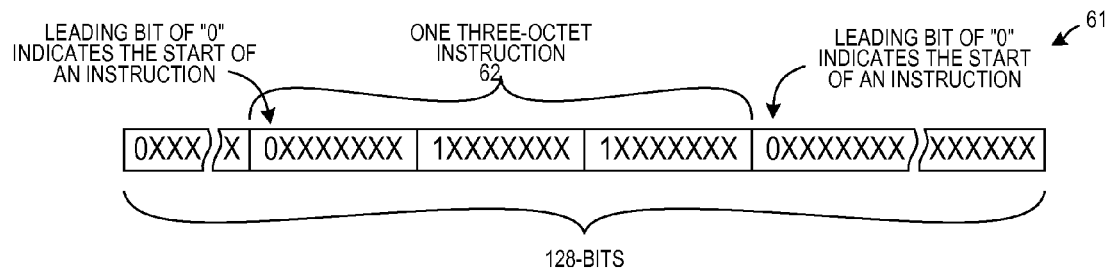
FIG. 4 is a diagram of one 128-bit block of information within the section of code of FIG. 3.

FIG. 4 is a diagram of one 128-bit block 61 of information, and one three-octet instruction 62 within the block 61. The first octet of each instruction starts with a "0" bit. The second octet of a multi-octet instruction starts with a "1" bit. The third octet of a three-octet instruction starts with a "1" bit. The decode stage 10 uses these leading bits of the octets to parse the octets of a block of information and to identify the boundaries between instructions.

Figure 5:
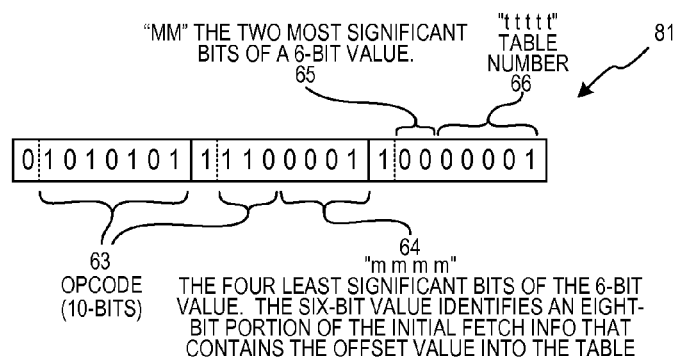
FIG. 5 is a diagram of a fetch instruction in which the offset value is a value in the initial fetch information value.

FIG. 5 is a diagram that illustrates a fetch instruction 81 where the offset value is a value in the initial fetch information value. The instruction is a three-octet instruction. The opcode 63 is ten bits. The four "mmmm" bits 64 and the two "MM" bits 65 together form a six-bit value, where this six-bit value identifies one eight-bit portion of the initial fetch information value that contains the offset value. Each eight-bit portion of the initial fetch information value is numbered, and the value "MMmmmm" is the number of one of these eight-bit portions. The five "ttttt" bits 66 indicate the table number. As mentioned above, in one example the table number is translated by the lookup table circuit 30 into the base address value where the table starts in memory.

Figure 6:
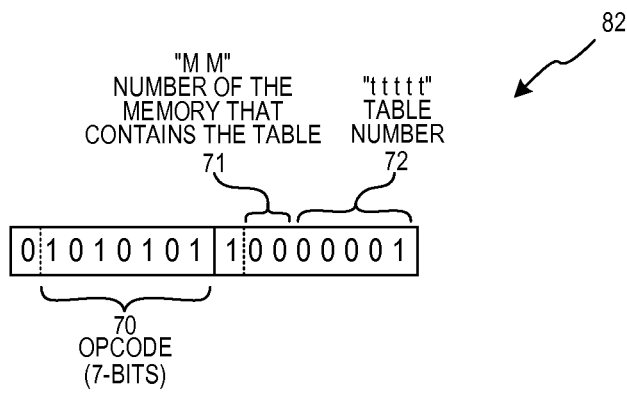
FIG. 6 is diagram of a fetch instruction in which the offset value is a value in the input data value.

FIG. 6 is a diagram that illustrates a fetch instruction 82 where the offset value is a value in the input data value. The instruction is a two-octet instruction. The opcode 70 is seven bits. The two "MM" bits 71 indicate the memory that contains the table. In the present example, memory system 3 is identified by an "MM" value of "00". The five "ttttt" bits 72 indicate the table number. The packet pointer identifies one of the eight-bit portions of the input data value, and this eight-bit portion is used as the offset value.

Figure 7:
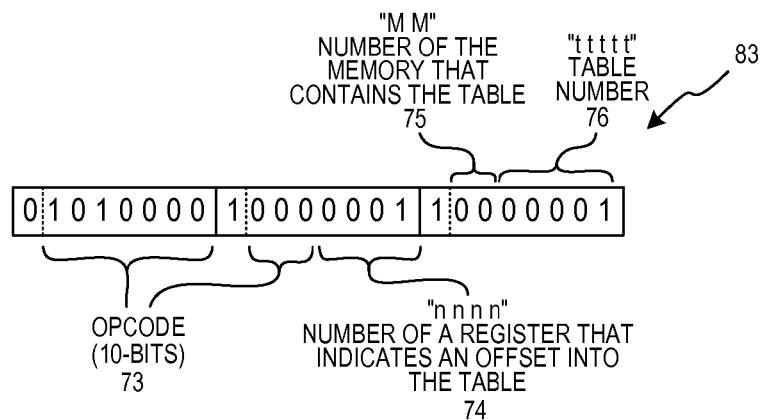
FIG. 7 is diagram of a fetch instruction in which the offset value is in a specified register of the register file of the processor.

FIG. 7 is a diagram that illustrates a fetch instruction 83 where the offset value is in a specified register in the register file 37. The instruction is a three-octet instruction. The opcode 73 is ten bits long. The four "nnnn" bits 74 indicate the number of the register in the register file 37 that contains the offset value into the table. The two "MM" bits 75 indicate the memory that contains the table to be fetched from. The five "ttttt" bits 76 specify the table number.

Figure 8:
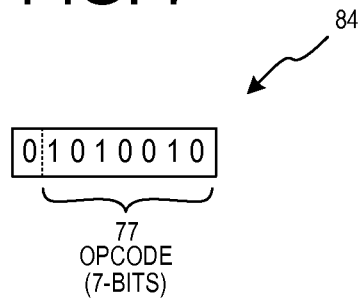
FIG. 8 is a diagram of a fetch more instruction.

FIG. 8 is a diagram that illustrates a fetch more instruction 84. This instruction is one octet in length, and only contains a seven-bit opcode 77. The instruction causes a fetch of the next 128-bit block of information that is located in the memory immediately after the last 128-bit block of information that was fetched. The memory from which the fetch is conducted is the same memory from which the last fetch was conducted.

FIG. 9 is a diagram of a two-octet conditional skip instruction 91 that explicitly specifies a skip count and a predicate function. The opcode 92 of skip instruction 91 is "1110000". If a predicate condition as determined by the value of the predicate code field 93 is true (if the predicate condition is "satisfied"), then execution of a number of subsequent instructions (instructions that follow the skip instruction in the sequence of instructions fetched) specified by the 3-bit skip count field 94 are "skipped". Inclusion of such a skip instruction into a sequence of instructions generally does not affect or change the number or order or flow of instructions decoded by the decode stage 30 of the pipeline. The number and order and flow of instructions that are decoded by the decode stage 30 may be the same, regardless of whether the predicate condition is satisfied and a subsequent instruction or instructions are skipped, and regardless of whether the predicate instruction is not satisfied and a subsequent instruction or instructions are not skipped. Similarly, the fetching of instructions can be the same, regardless of whether the skip occurs, or not. If the predicate condition of the skip instruction is true and a subsequent instruction or instructions are skipped, however, then the execute stage 12 of the pipeline does not carry out the instruction operation of any skipped instruction. In addition, the skip instruction 91 includes a "flag don't touch" bit 95. If the "flag don't touch" bit 95 is set, then neither the skip instruction 91 nor any subsequent skipped instructions (skipped due to the skip instruction) are enabled to change the values of the carry bit C 67 and the zero bit Z 68. If the "flag don't touch" bit 95 is not set, on the other hand, then either the skip instruction 91 or any subsequent skipped instructions (skipped due to the skip instruction) can change the values of the carry bit C 67 and the zero bit Z 68.

FIG. 10 is a diagram that sets forth the predicate codes indicated by the three predicate bits.

FIG. 11 is a diagram that illustrates an efficient skip instruction 48. This instruction is one octet in length and includes a seven-bit opcode 96. Rather than there being a skip count filed, the opcode 96 itself is used as an indication that only the next one instruction will be skipped. There is another similar single-octet skip instruction whose opcode is used as an indication that the next two instructions will be skipped. Rather than the predicate code being explicitly specified by the instruction itself as in the instruction 91 of FIG. 9, in the case of the instruction 48 of FIG. 11 the 3-bit value of the predicate bits 79 are used to specify the function of the C and Z flags that condition carrying out of the skip.

Figure 12:
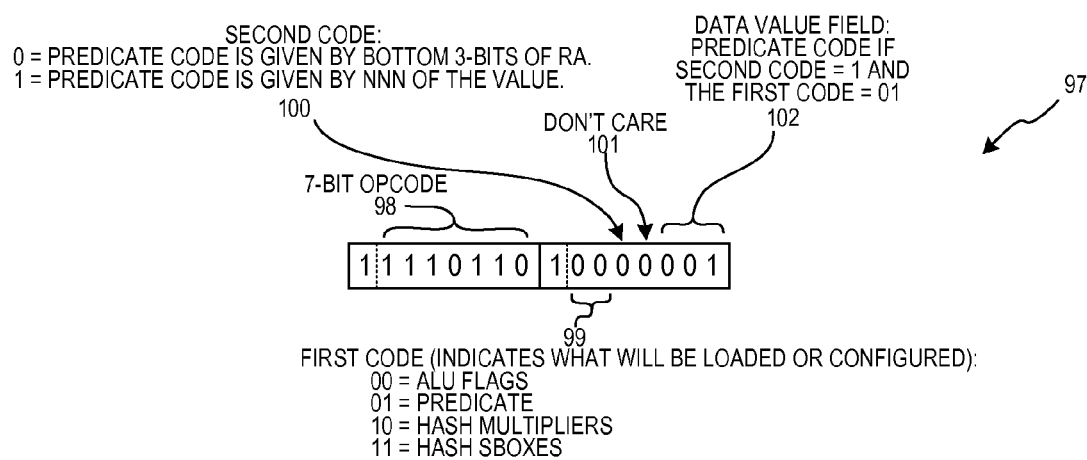
FIG. 12 is a diagram of a load register file read stage control register instruction.

FIG. 12 is a diagram that illustrates a load register file stage control register instruction 97. This instruction 97 is also referred to as a "set RF CSR" instruction. The instruction 97 includes a 7-bit opcode 98, a 2-bit first code field 99, a 1-bit second code field 100, a don't care bit 101, and a 3-bit data value field 102. The value of the 2-bit first code field 99 specifies a circuit or amount of circuitry that will be loaded or configured due to execution of the instruction 97. For example, if these two bits are "01", then execution of the instruction 97 will cause the predicate bits 79 in the register file read stage 11 (see FIG. 1) to be loaded. If the value of the second code field 100 is "1" then the values of the data value field 102 of the instruction are the values that will be loaded into the predicate bits 79, whereas if the value of the second code field 100 is "0" then the three least significant bits of the value RA of register A will be loaded into the predicate bits 79.

Figure 13:
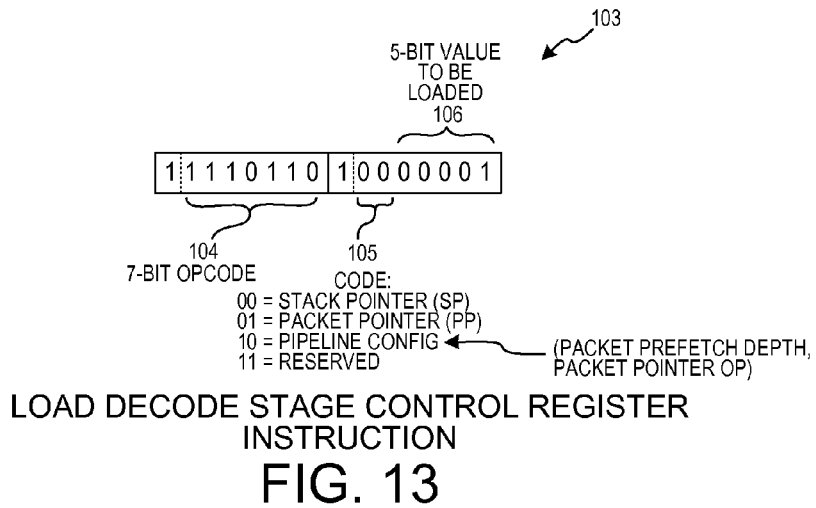
FIG. 13 is a diagram of a load decode stage control register instruction.

FIG. 13 is a diagram that illustrates a load decode stage control register instruction 103. This instruction 103 is also referred to as a "set decode CSR" instruction. The instruction 103 includes a 7-bit opcode 104, a 2-bit code field 105, and a 5-bit data value to be loaded. The 2-bit value of the code field 105 indicates a circuit or amount of circuitry that will be loaded or configured due to execution of the instruction 103. For example, if the 2-bit code is "00" then the value of the stack pointer SP 35 is changed to be the 5-bit value set forth by the 5-bit data value 106 of the instruction.

The load CSR (control store register) instructions 97 and 103 of FIGS. 12 and 13 are different from other instructions executed by the processor in that loading operations they specify occur one clock cycle earlier than they would occur were they to be carried out by the execute stage in ordinary course. In a first clock cycle, the decode stage 10 decodes the load CSR instruction, and the specified loading operation then occurs in the very next clock cycle. Due to the load operation occurring one clock cycle earlier than they ordinarily would, the load CSR instruction can be used in an advantageous manner with a preceding instruction where the preceding instruction uses the ALU 43 to determine a value that is then loaded into the A register. In one novel aspect, the preceding instruction uses the ALU 43 to determine a value that then, as a result of execution of the instruction, loads the ALU output value into the register A (as pointed to by the A register pointer AP 33). The very next instruction to be executed by the processor is a load CSR instruction, such as the "load register file stage control register instruction" 97 of FIG. 12. The instruction 97 specifies that the predicate bits 79 are to be loaded with the contents RA of the register A. The instruction 97 is decoded in a clock cycle, and in the very next clock cycle the loading of the predicate bits P 79 occurs. The predicate bits P 79 are loaded with the contents RA of the register A before the contents RA can be changed as a consequence of execution of the instruction 97 itself. Now that the predicate bits 79 are loaded with the desired values, a next skip instruction can be of the one-octet efficient and short type set forth in FIG. 11, where the predicate code values of the predicate bits 79 are used to specify the predicate function. Alternatively, the next instruction is another type of conditional predicated instruction, where the predicate code values of the predicate bits 79 are used to specify the predicate function. In one novel aspect, there are multiple such efficient and short conditional predicated instructions, where each of the instructions is a short one-octet instruction that does not explicitly set forth the 3-bit predicate code but rather where the 3-bit predicate code is set forth by the same 3-bit value of the predicate bits 79 as stored in the register read file stage 11.

Figure 14:
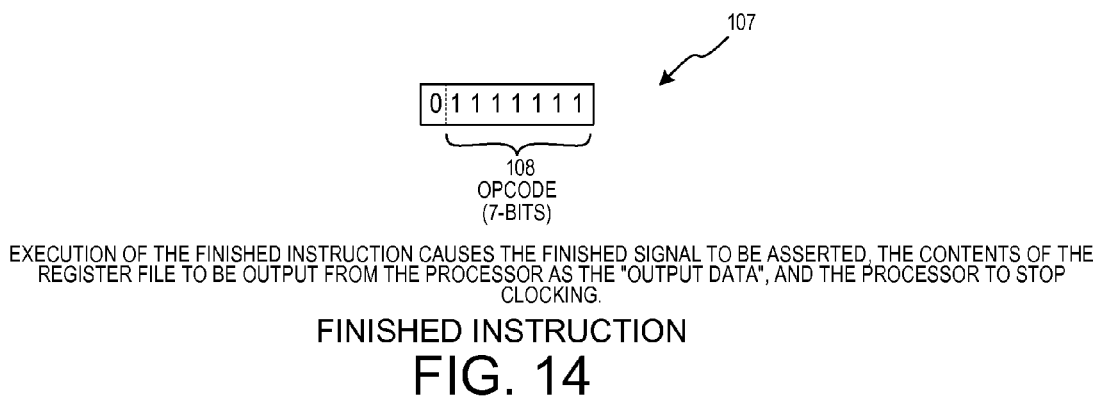
FIG. 14 is a diagram of a finished instruction.

FIG. 14 is a diagram that illustrates the finished instruction 107. This instruction is one octet in length and includes a seven-bit opcode 108. As mentioned above, execution of the finished instruction causes the pipeline to stop clocking, and causes the state machine 6 to transition to the finished state. In the finished state, the state machine 6 causes the processor circuit 2 to assert the "PE has data to read" signal 52.

FIG. 15 is a state diagram of the state machine 6. The four states are the idle state 16, the enable clock signal state 22, the operating state 50, and the finished state 51. Assertion of the start signal 21 (also called the "PE select signal") causes the state machine to transition from the idle state to the enable clock signal state. Assertion of the operating signal 55 (also called the "PE has read the data" signal) causes the state machine to transition from the enable clock signal state to the operating state. Assertion of the finished signal 48 from the execute stage causes the state machine to transition from the operating state to the finished state. Assertion of the "output data was read" signal 54 causes the state machine to transition from the finished state to the idle state.

Figure 16:
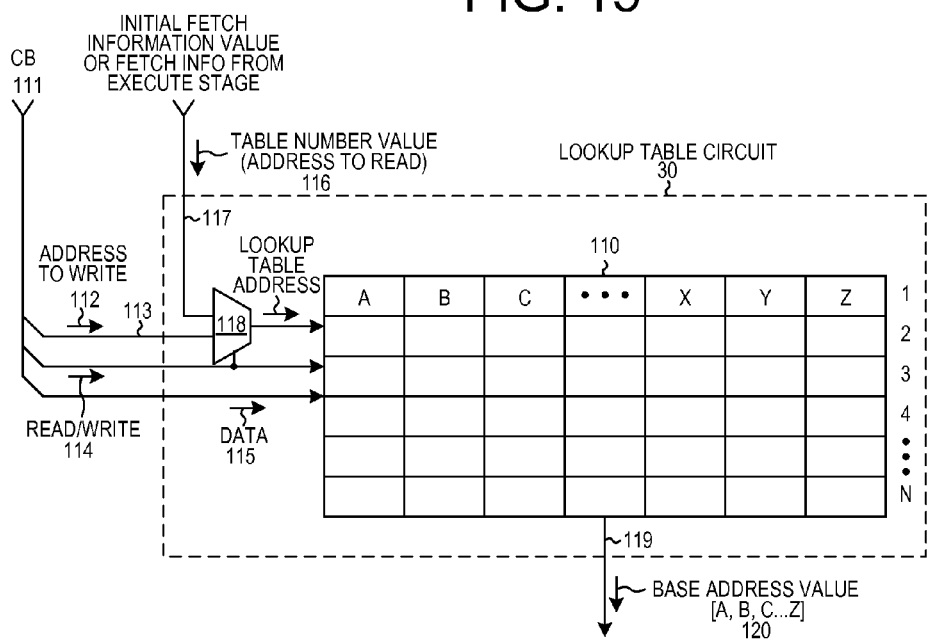
FIG. 16 is a simplified diagram of one possible implementation of the lookup table circuit 30 within the fetch request stage 8 of FIG. 1.

FIG. 16 is a simplified diagram of the lookup table circuit 30 in the fetch request stage 8 of FIG. 1. The data contents of the memory portion 110 can be written via a control bus CB 111. An address 112 of a memory location in the memory portion 110 is supplied via lines 113, and the read/write signal 114 is set to indicate a write operation, and the data 115 to be written is supplied via the control bus 111 to the memory portion 110. In this way, the contents of the addressed memory location of the memory portion 110 are pre-loaded and setup before processor circuit 2 operation, or during downtimes during which the processor circuit 2 is not being used. To perform a table number value to base address value lookup, the table number 116 is supplied to the lookup table circuit 30 via input conductors 117 when the read/write control signal 114 is set to indicate a read operation. The read/write signal 114 controls the address multiplexer 118.

The multi-bit content of the memory location addressed by the table number value is then output from the lookup table circuit 30 onto output conductors 119 as the base address value 120.

Figure 17:
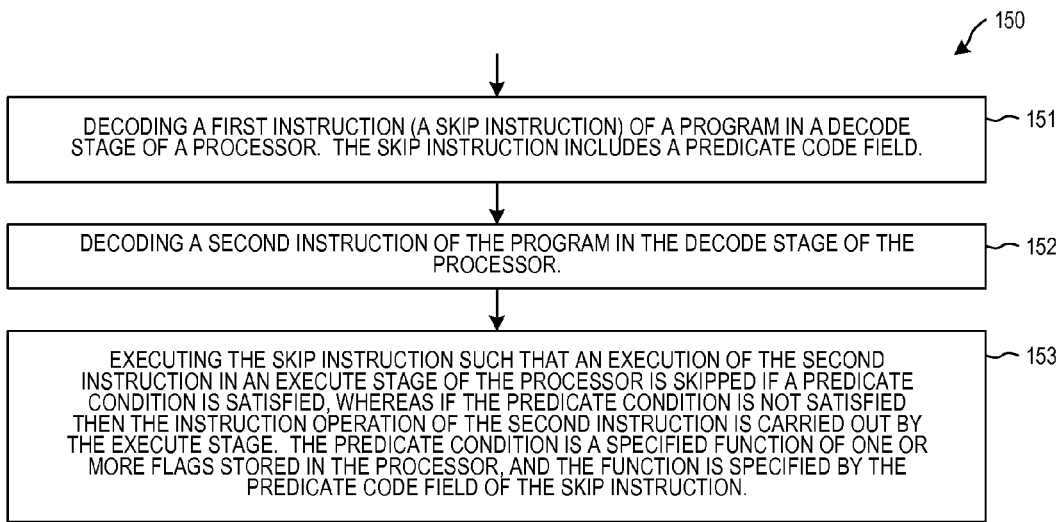
FIG. 17 is a flowchart of a method 150 in accordance with a first novel aspect.

FIG. 17 is a flowchart of a method 150 in accordance with a first novel aspect. A program of instructions for the pipelined processor 4 of FIG. 1 includes a first instruction and a second instruction, where the first instruction is a conditional skip instruction. The fetch request stage 8 causes the first and second instructions to be fetched from the memory system 3. The conditional skip instruction may, for example, be of the form set forth above in FIG. 6 where the skip count is one. The first instruction is decoded (step 151) in the decode stage of the processor, and then the second instruction is decoded (step 152) in the decode stage of the processor. The first and second instructions pass through the pipeline 7, one after another, without there being any intervening decoding of any instruction. The skip instruction is executed (step 153) such that an execution of the second instruction in an execute stage of the processor is "skipped" if a predicate condition is satisfied (is "true"), whereas if the predicate condition is not satisfied (in "not true") then the instruction operation of the second instruction is not "skipped" but rather is carried out by the execute stage. Accordingly, whether or not the predicate condition is true determines whether or not the second instruction is executed. The predicate condition is a specific function of one or more flag bits stored in the processor. In one example, the flag bits are a zero flag Z and a carry flag C stored in the register file read stage 11 of the processor. The function is specified by the value of the predicate code bits of the predicate field of the skip instruction. The second instruction (the skipped instruction) is decoded in the decode stage, but its instruction operation is not carried out by the execute stage.

Figure 18:
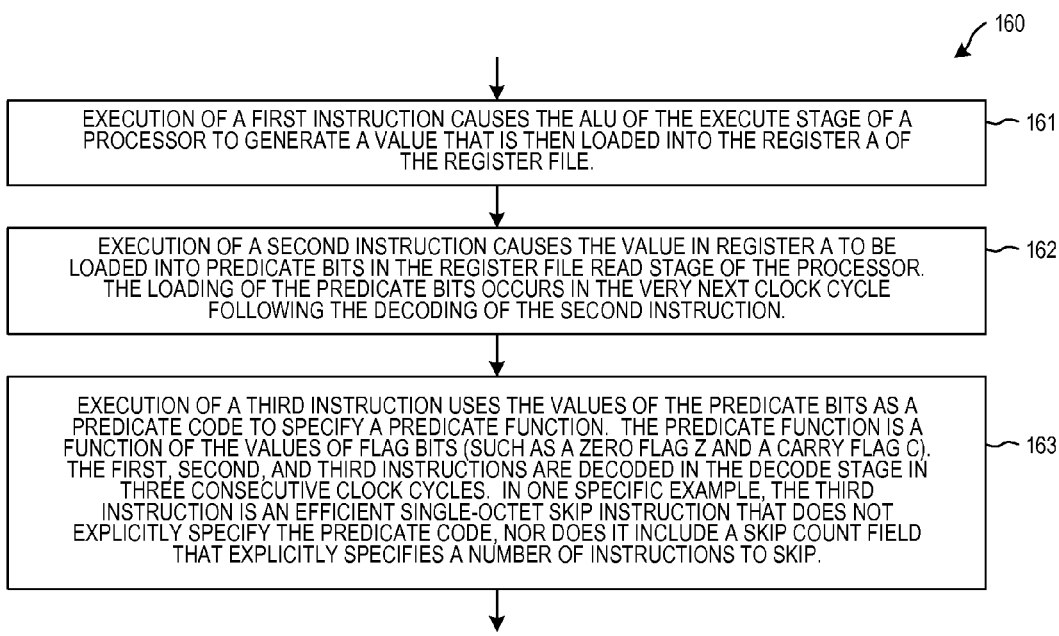
FIG. 18 is a flowchart of a method 160 in accordance with a second novel aspect.
Figure 19A:
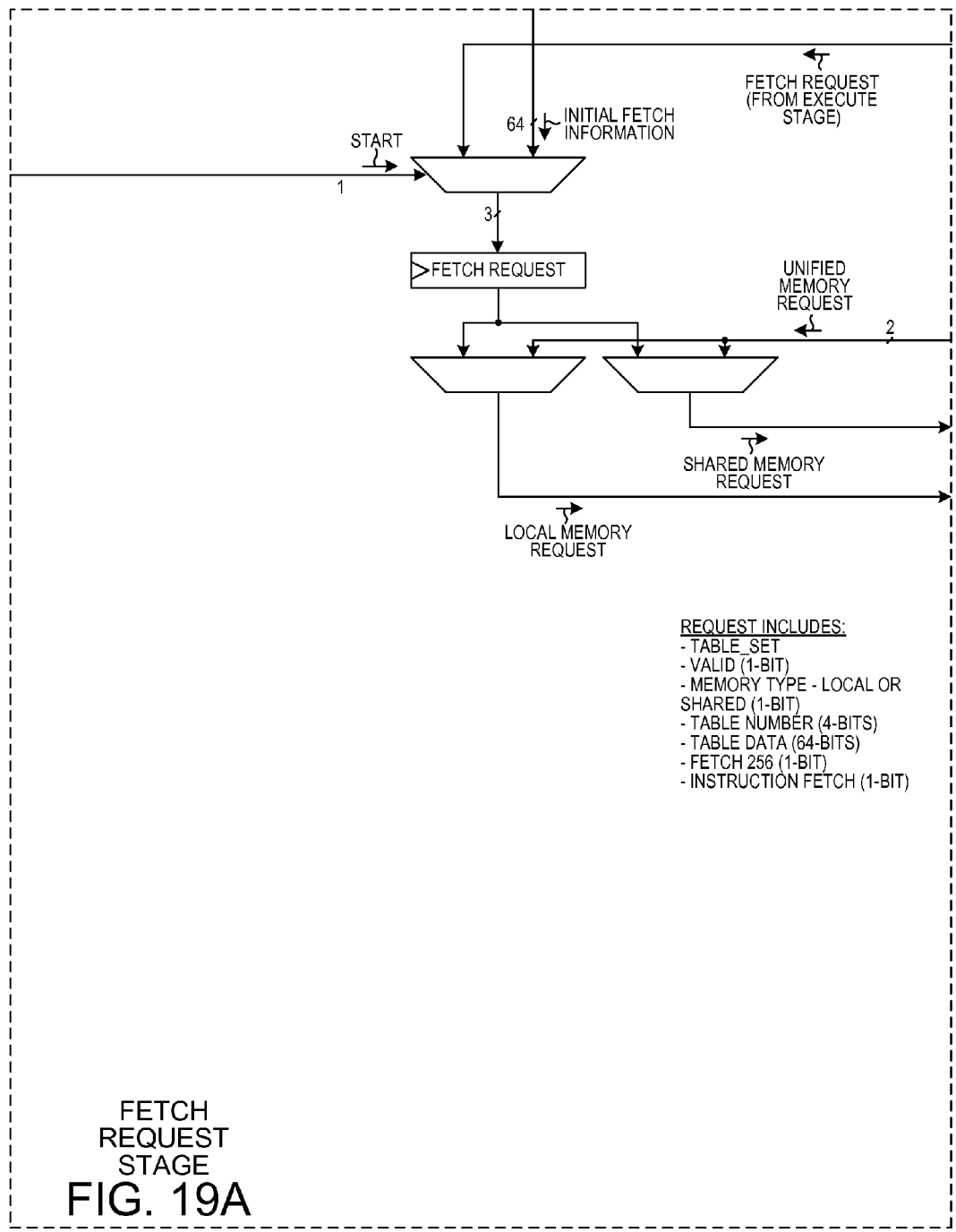
Figure 19B:
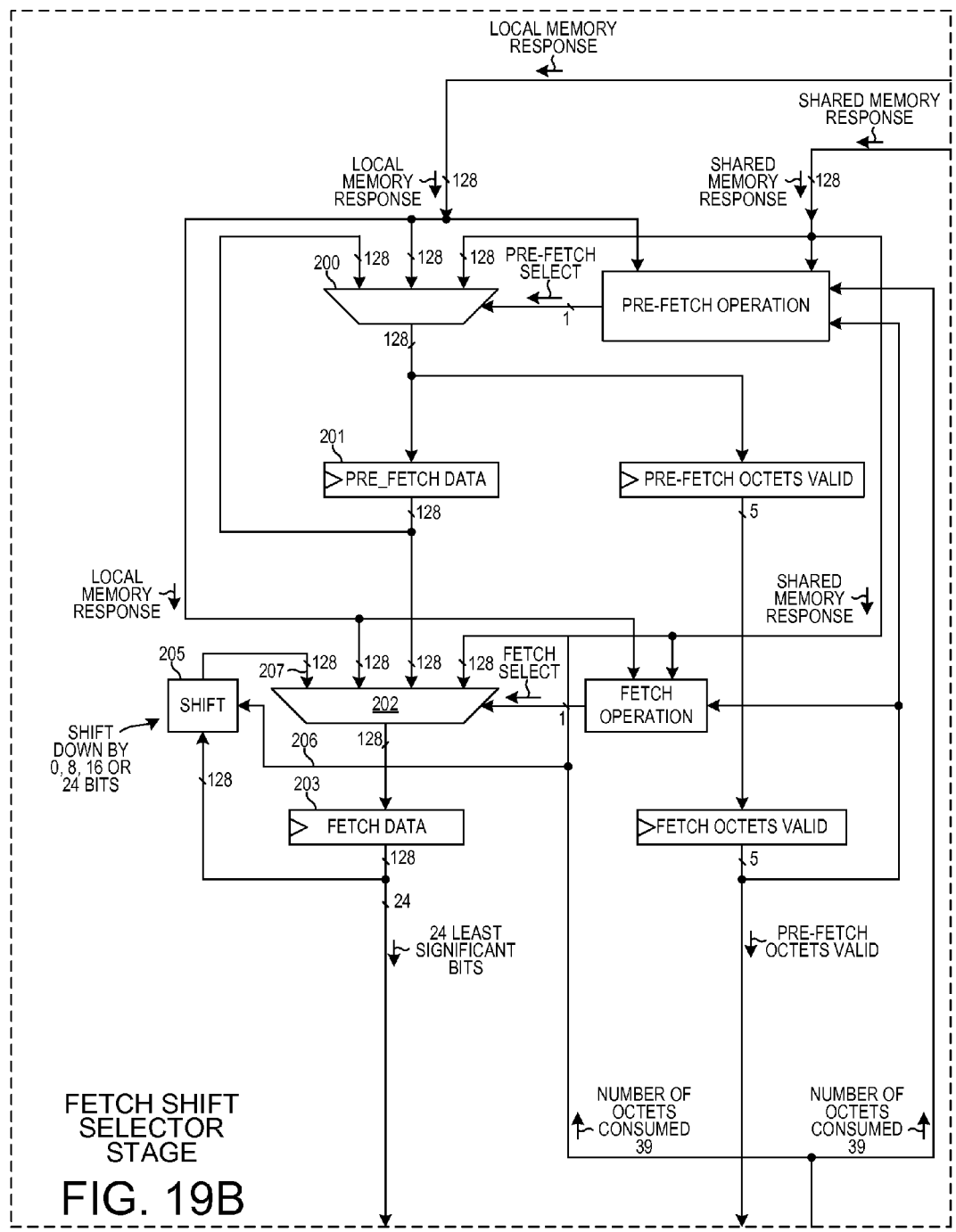
FIG. 19B is a diagram of a part of a larger diagram of FIG. 19.
Figure 19D:
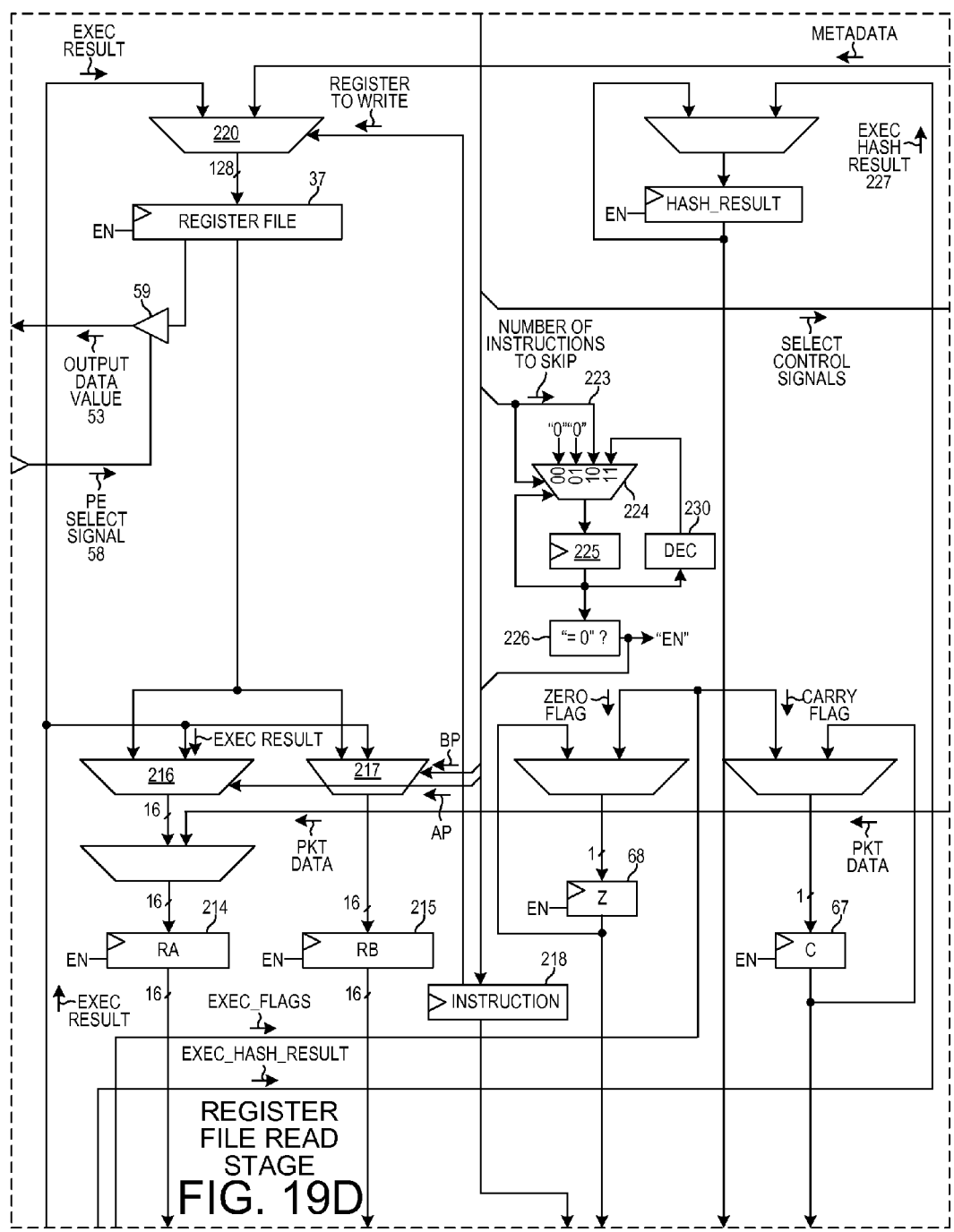
FIG. 19D is a diagram of a part of a larger diagram of FIG. 19.
Figure 19E:
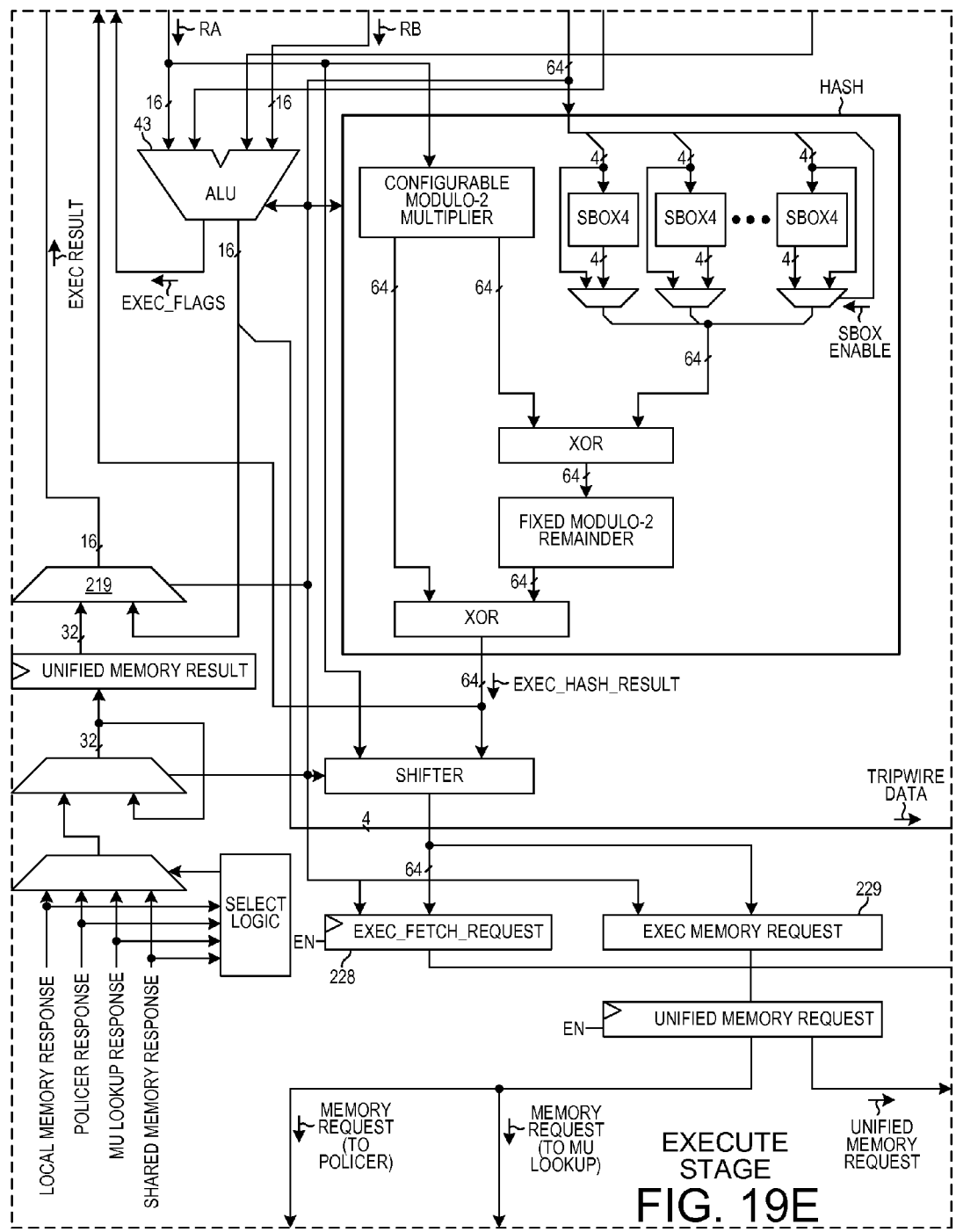
FIG. 19E is a diagram of a part of a larger diagram of FIG. 19.
Figure 19F:
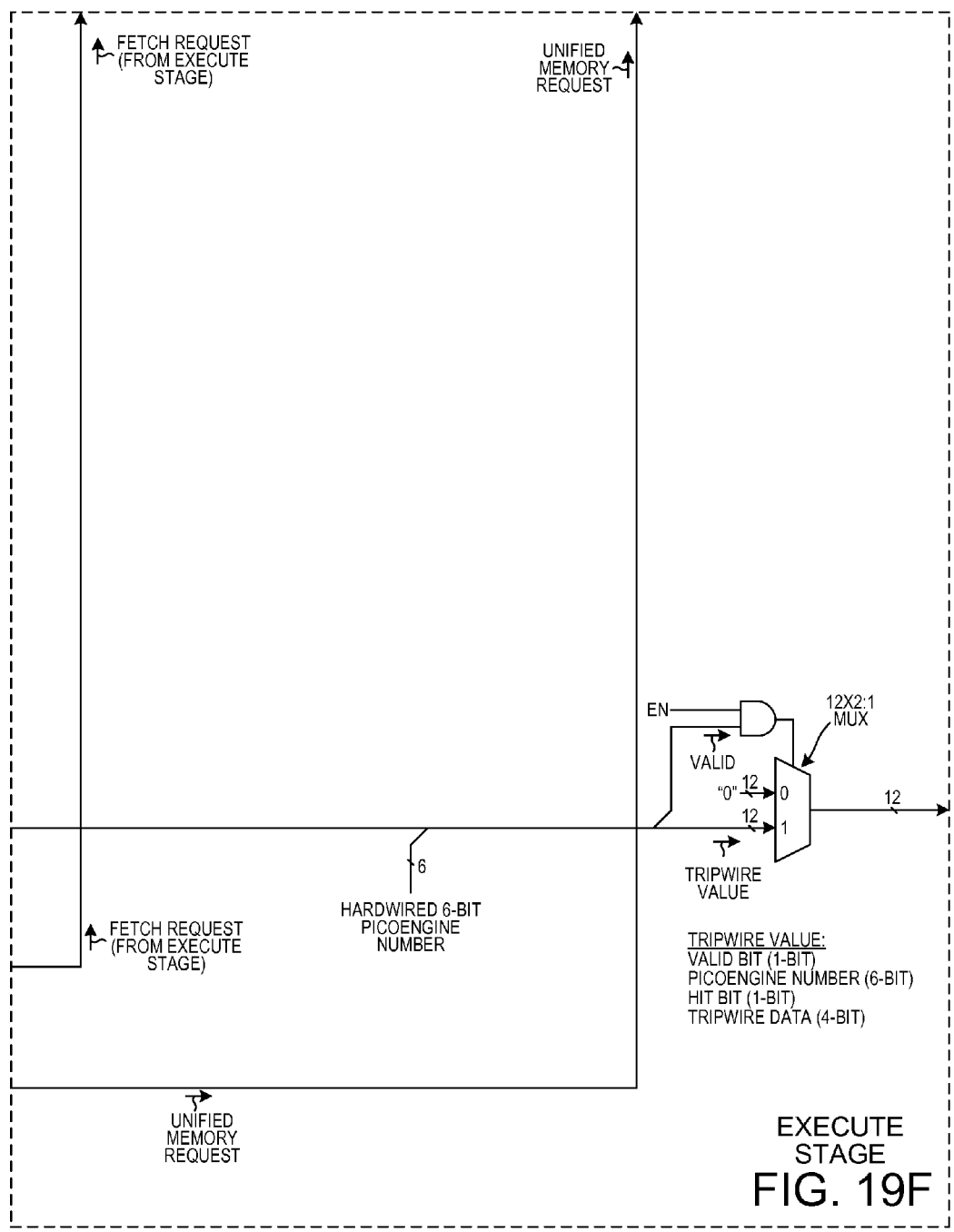
FIG. 19F is a diagram of a part of a larger diagram of FIG. 19.
Figure 19H:
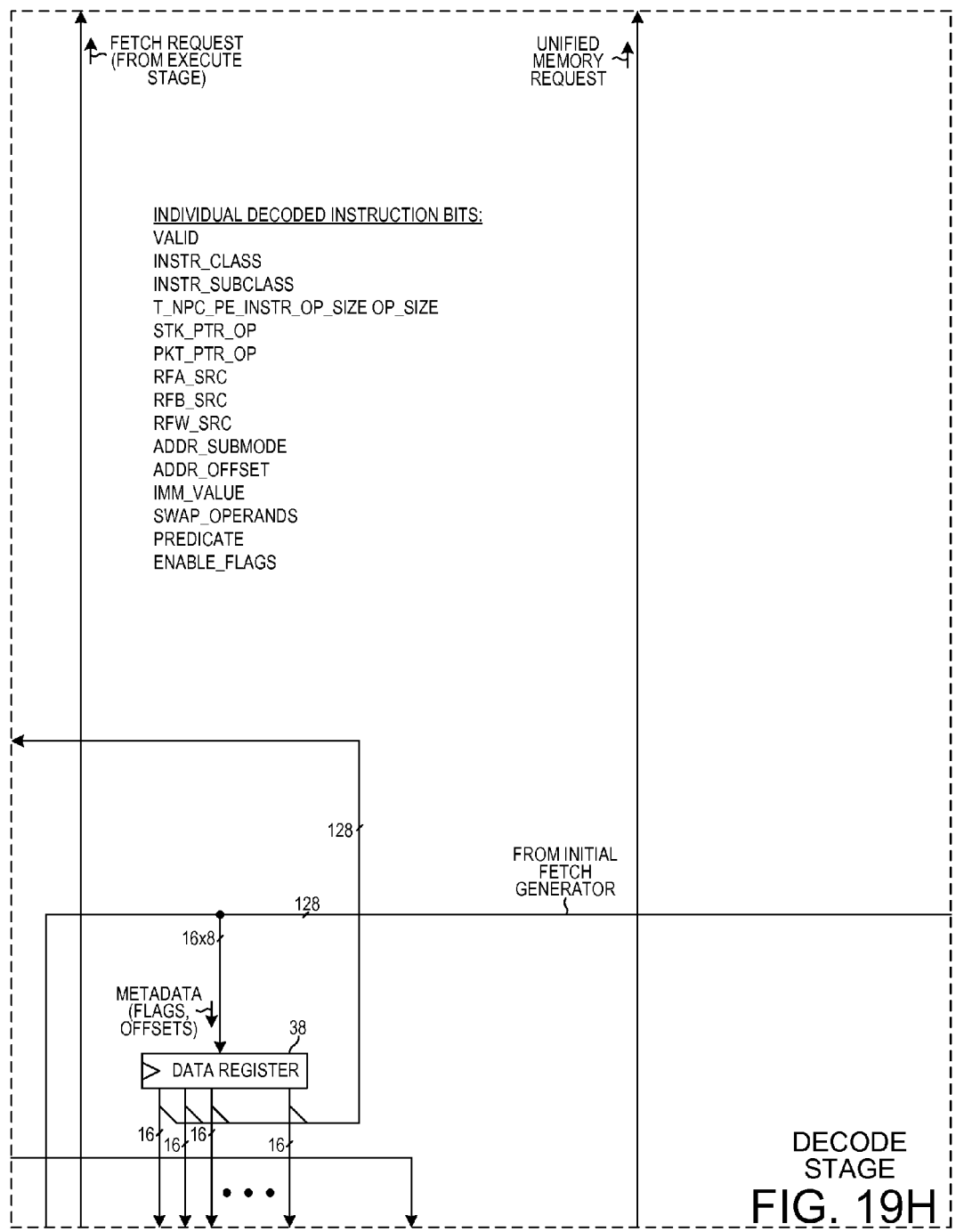
FIG. 19H is a diagram of a part of a larger diagram of FIG. 19.

FIG. 18 is a flowchart of a method 160 in accordance with a second novel aspect. There are three consecutive instructions that are fetched, and that flow through the pipeline of the processor, one after another. Execution of the first instruction causes the ALU 43 to generate an output value that is then loaded into the register A. Execution of the second instruction accesses the value from register A and loads this value into the predicate bits P 79. In one novel aspect, this second instruction is the "load register file read logic stage control register instruction" 97 of FIG. 12. The loading of the predicate bits P 79 occurs in the very next clock cycle after the clock cycle in which the second instruction was decoded. Execution of the third instruction uses the values of the predicate bits P 79 (as loaded by the second instruction into the register file read stage 11) as the 3-bit predicate code to specify a predicate function on the flags C and Z. The third instruction is a conditional instruction, the instruction operation of which is only carried out if the predicate condition is true. In one example, the third instruction is an efficient single-octet instruction such as the single-octet skip instruction 48 of FIG. 11. In another novel aspect, there is also a fourth instruction that is also an efficient single-octet conditional instruction. The carrying out of the instruction operation of the fourth instruction is also conditioned on the predicate condition being true, as specified by the very same values of the predicate bits P 79 that were used to condition the carrying out of the instruction operation of the second instruction. The first, second, third and fourth instructions are decoded in four consecutive clock cycles.

The providing of predicate code bits P 79, along with a companion load predicate instruction, along with short conditional instructions that use the values of these predicate bits as a predicate code to specify a predicate function, may be used to reduce code space in memory system 3 because typically the predicate conditions of conditioned instructions in a given section of code can all be conditioned in the same way. These predicate conditions typically depend on characteristics of the input data value 20. The same predicate code can therefore be used for all the conditioned instructions of the section of code.

Although in the specific embodiment of FIG. 1, the lookup table circuit 30 is disposed in the fetch request stage 8, in other embodiments the lookup table circuit that converts a table number value into a base address value is disposed in the memory system 3. In still other embodiments, there is no table number to base address lookup table circuit. If a lookup table circuit is disposed in the memory system 3, then the memory request 26 as received onto the memory system 3 may include the table number value. The lookup table circuit of the memory system 3 then uses the table number value to determine the base address value, and the base address value along with the offset value is then used to read the block of information from the memory of the memory system. In the same way that a table number value can be converted into a base address value by a lookup table circuit located in the fetch request stage 8, so too can another value (for example, a flag value or flag values) in the initial fetch information value 24 be converted by a lookup table circuit in the fetch request stage 8 into the offset value. Similarly, a lookup table circuit that converts a flag value or values into the offset value can be located in the memory system 3. The contents of these lookup table circuits can be loaded by the processor circuit itself, or in other embodiments can be loaded via a separate control bus (CB).

In one example, to realize an integrated circuit embodiment of the pipelined run-to-completion processor 4 of FIG. 1, the function of the each circuit block of the processor 4 is described in a hardware description language (for example, Verilog or VHDL). A commercially available hardware synthesis program (for example, Synopsis Design Compiler) is then employed to generate digital logic circuitry from the hardware description language description, where the synthesized digital logic circuitry performs the function described by the hardware description language. The processor 4 is realized in this way to be a small circuit of about ten thousand equivalent gates. An embodiment of processor 4 may be made available by one company as a predesigned block of circuitry that is then incorporated into another company's integrated circuit design as a general purpose block. Such a predesigned block of IP is sometimes referred to in the art as a block of "IP". A hardware designer who incorporates the predesigned block of IP into a larger integrated circuit design need not understand or be aware of the internal structure and operation of the pre-designed block, but rather interfaces to the pre-designed block in accordance with an interface description supplied by the original designer of the predesigned block. Rather than being supplied as a block of IP to be incorporated into another integrated circuit, the novel processor 4 can be supplied to end customers as a separate discrete integrated circuit of general utility in data processing applications.

FIG. 19 is a detailed diagram of one specific implementation of the pipeline 7 of the run-to-completion processor 4 of FIG. 1. One 128-bit block of octets is received onto the processor from the memory system 3 via memory interface port 78. The 128 bits pass through multiplexer 200 and are latched into pre-fetch data register 201. The 128 bits pass through multiplexer 202 and are clocked into fetch data register 203. The least significant (leftmost) twenty-four of the bits pass from the fetch data register 203 down to a "delineate instruction" block 204 in the decode stage 9. The 128 bits also pass to the left to a shifter 205. The shifter shifts the 128-bit value on its input to the right, either by 0 bits, 8 bits, 16 bits, or 24 bits. The number of bits shifted is determined by the 2-bit value on input leads 206. When performing a shift, the leftmost bits of the resulting shifted value are replaced with one, two, or three NOP instruction opcodes. The resulting shifted 12-bit value is supplied from the shifter 205 to input 207 of multiplexer 202. In the decode stage, the "delineate instruction" block 204 examines the least significant twenty-four bits of the incoming 128-bit block, and looks at the leading bits of the octets. From these leading bits, the "delineate instruction" block determines whether the octet in the least significant bit position is the first octet of a single-octet instruction, or is the first octet of a two-octet instruction, or is the first octet of a three-octet instruction. The number of octets of this first instruction is output as the "number of octets consumed" signal 39. This "number of octets consumed" signal 39 is the control signal supplied to shifter 205. Accordingly, after the first leftmost instruction has been decoded, the 128-bit incoming value to the shifter is shifted to the right by a number of octets such that the leftmost octet of the least significant 24-bits supplied to the "delineate instruction" block 204 is the leftmost octet of the next instruction. In this way, as instructions are decoded, the shifter 205 shifts the 128-bit value to the right a number of octets so that the "delineate instruction" block receives the next instruction to be deciphered.

In addition to determining the number of octets in the instruction, the delineate instruction block 204 also examines the instruction and determines the instruction type, as indicated by the opcode of the instruction. The instruction can be a local operation, a decode packet operation, a decode memory operation, a decode hash operation, a decode fetch operation, or a decode miscellaneous operation. Each of the decode blocks 208-213 examines and decodes the twenty-four bits output by the "delineate instruction" block 204 and outputs a set of fifty-two "individual decoded instruction" bits. For example, three bits of the "individual decoded instruction" bits are denoted "RFA_SRC" and this value is used to generate the pointer AP that is then stored in AP register 33. The pointer AP is used to select a part of the register file 37 that is then clocked into the A register 214. For example, three bits of the "individual decoded instruction" bits are denoted "RFB_SRC" and this value is used to generate the pointer BP that is then stored in register 34. The pointer BP is used to select a part of register file 37 that is then clocked into the B register 215.

Multiplexer 216 receives all the bit values stored in the register file 37, and selects one sixteen-bit portion based on the pointer AP (as supplied onto the select input of the multiplexer 216). Similarly, multiplexer 217 receives all the bit values stored in the register file 37, and selects one sixteen-bit portion based on the pointer BP (as supplied onto the select input of the multiplexer 217). The register file read stage supplies values, such as the contents of the A register 214 and the B register 215, to inputs of the ALU 43. The contents of the instruction register 218 determines the operation performed by the ALU 43. The sixteen-bit output value of the ALU 43 passes through multiplexer 219 and multiplexer 220 and is clocked back into the register file 37. Some of the bits of the register file 37 are the output data value 53. If the output data value 53 is to be read by an external circuit, then the external circuit asserts the PE select signal 58 so that the output buffers 59 are enabled. The output buffers 59 drive the output data value 53 to the external circuit. Depending on the instruction to be executed, the register A 214 can be loaded with a 16-bit part of the contents of the data register 38. Which 16-bit part is determined by the instruction decode. The selected part is supplied by multiplexer 221 and multiplexer 222 to register A 214.

If the instruction being decoded is a skip instruction, then the skip count is supplied via conductors 223 to multiplexer 224. If the number of instructions to be skipped is zero, then either the "00" multiplexer input or the "01" multiplexer input is selected. In either case, a value of zero passes through multiplexer 224 and is latched into register 225. If the value as output by register 225 is zero, then the EN signal output of comparator 226 is asserted. All the registers 37, 227, 214, 215, 68, 67, 228 and 229 have synchronous enable signal inputs, and these inputs are coupled to receive the enable signal EN. Consequently, if the number of instructions to skip is zero, then these registers are enabled, and the execution of no instruction is skipped. If, however, the number of instructions to skip as supplied to multiplexer 224 is not zero, then muiltiplexer 224 initially couples the value on its "10" input to its output. The number of instructions to skip is therefore clocked into register 225. Because the value supplied to comparator 226 is non-zero, the enable signal EN is not asserted and the registers listed above are disabled (not enabled). This disabling prevents execution of an instruction. On the next clocking of the pipeline, the decremented number of instructions to skip (as output by decrementer 230) is passed back through multiplexer 224 and is latched into register 225. This process of decrementing the number of instructions to be skipped, clock cycle by clock cycle, is continued until the decremented number equals zero. When the decremented number equals zero, then the comparator 226 causes the enable signal EN to be asserted, which in turn stops the skipping of execution of instructions. Due to the enable signal EN having been deassserted for a number of clock cycles, execution of the appropriate number of instructions is prevented.

Figure 20:
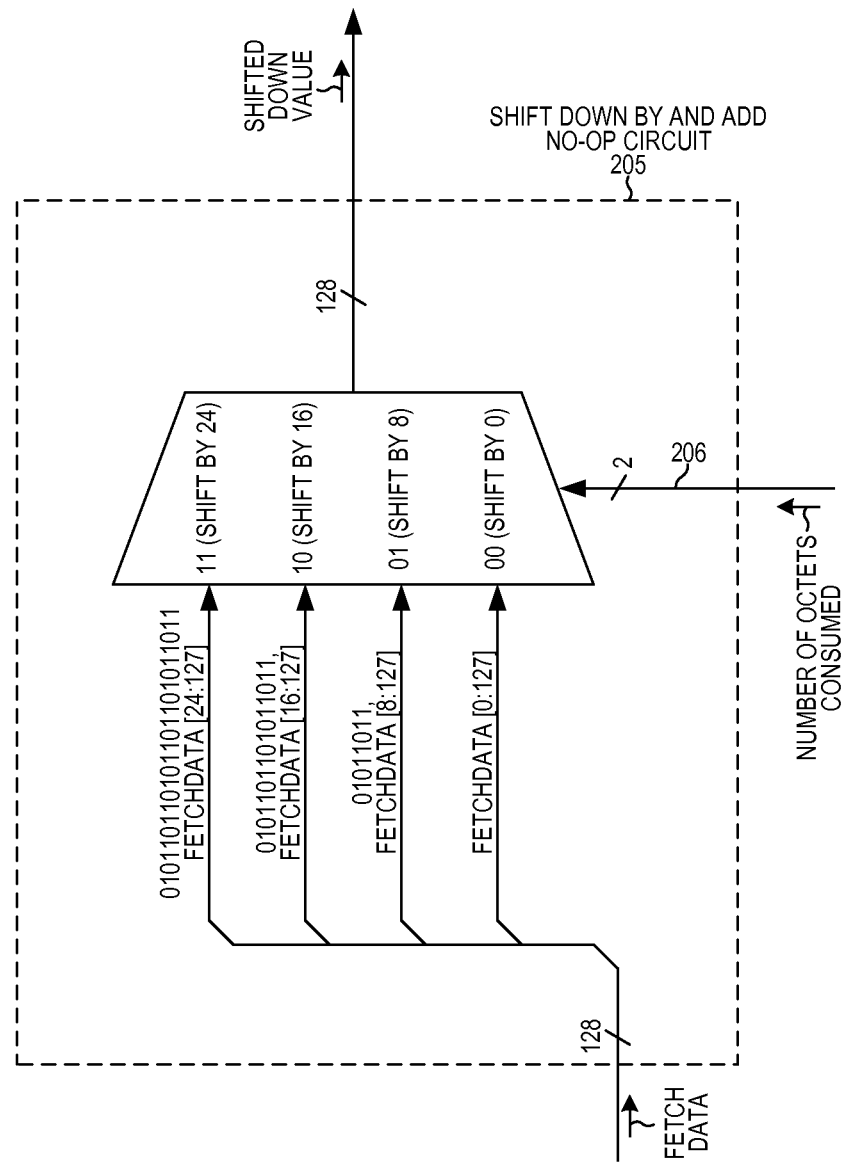
FIG. 20 is a more detailed diagram of shifter 205.

FIG. 20 is a more detailed diagram of shifter 205.

Although certain specific embodiments are described above for instructional purposes, the teachings of this patent document have general applicability and are not limited to the specific embodiments described above. The particular interface signaling and interface logic of FIG. 1 that interfaces the pipelined run-to-completion processor 4 to the external circuit that kick-starts the processor and that reads output data values, as described above in connection with FIG. 1, is just one illustrative example. Other suitable interface circuits are employed in other embodiments. Input data values going into the processor and output data values coming out of the processor may be buffered, for example using FIFOs. Accordingly, various modifications, adaptations, and combinations of various features of the described embodiments can be practiced without departing from the scope of the invention as set forth in the claims.

What is claimed is:

1. A processor coupled to a memory system, the processor comprising:
   a fetch stage that causes a sequence of instructions to be fetched from the memory system, wherein the sequence of instructions includes a first instruction and a second instruction;
   a decode stage that first decodes the first instruction and then decodes the second instruction, wherein the decode stage can decode skip instructions;

a register file read stage coupled to the decode stage, wherein the register file read stage includes a plurality of flag bits and a plurality of predicate bits; and an execute stage that can carry out an instruction operation of an instruction, wherein the second instruction defines an instruction operation to be performed when the second instruction is executed by the processor, wherein if the first instruction is a skip instruction and if a predicate condition is satisfied then the instruction operation of the second instruction is not carried out by the execute stage even though the second instruction was decoded by the decode stage, wherein the predicate condition for the skip instruction is specified by values of the predicate bits, and wherein the predicate condition is a specified function of values of at least one of the plurality of flag bits.

2. The processor of claim 1, wherein the decode stage can decode a load predicate bits instruction, wherein the decode stage decodes the load predicate bits instruction in a first clock cycle, and wherein a carrying out of the load predicate bits instruction causes the predicate bits to be loaded with a data value during a second cycle, wherein the first and second clock cycles are sequential and there is no intervening clock cycle between the first and second clock cycles.

3. The processor of claim 2, wherein the register file read stage includes a register RA, wherein the register RA is coupled to an ALU (Arithmetic Logic Unit) in the execute stage, and wherein the data value that is loaded due to carrying out of the load predicate bits instruction is a data value stored in the register RA.

4. The processor of claim 2, wherein the register file read stage includes a register RA, wherein the register RA is coupled to an ALU (Arithmetic Logic Unit) in the execute stage, wherein the load predicate bits instruction includes a first code field, a second code field, and a data value field, wherein a value of the first code field indicates an amount of logic to be loaded or configured with the data value, wherein a value of the second code field indicates whether the data value is taken from the data value field of the load predicate bits instruction or whether the data value is taken from register RA.

5. The processor of claim 1, wherein the skip instruction includes an opcode, and wherein the opcode determines a number of subsequent instructions to be skipped, wherein the number is one.

6. The processor of claim 1, wherein the skip instruction includes an opcode, and wherein the opcode determines a number of subsequent instructions to be skipped, wherein the number is more than one.

7. The processor of claim 1, wherein the register file read stage further comprises a register file, and wherein a result value output by the execute stage due to processing of the second instruction is not stored in the register file if the second instruction is not carried out whereas the result value output by the execute stage due to processing of the second instruction is stored in the register file if the second instruction is carried out.

8. The processor of claim 1, wherein the skip instruction does not explicitly specify the predicate condition.

9. The processor of claim 1, wherein the skip instruction does not include a data value to be loaded into the predicate bits as a result of execution of the skip instruction.

10. A method comprising:
(a) causing a sequence of instructions to be fetched from the memory system, wherein the sequence of instructions includes a first instruction and a second instruction, wherein the causing of (a) is performed by a fetch stage of a processor;
(b) decoding the first instruction and then decoding the second instruction, wherein the decoding of (b) is performed by a decode stage of the processor, and wherein the decode stage can decode skip instructions;
(c) maintaining a plurality of flag bits and a plurality of predicate bits in a register file read stage of the processor; and
(d) carrying out an instruction operation of an instruction in an execute stage of the processor, wherein the second instruction defines an instruction operation to be performed when the second instruction is executed by the processor, wherein if the first instruction is a skip instruction and if a predicate condition is satisfied then the instruction operation of the second instruction is not carried out by the execute stage even though the second instruction was decoded by the decode stage, wherein the predicate condition for the skip instruction is specified by values of the predicate bits, and wherein the predicate condition is a specified function of values of at least one of the plurality of flag bits.

11. The method of claim 10, further comprising:
(e) decoding a load predicate bits instruction in the decode stage, wherein the decode stage decodes the load predicate bits instruction in a first clock cycle, and wherein a carrying out of the load predicate bits instruction causes the predicate bits to be loaded with a data value during a second cycle, wherein the first and second clock cycles are sequential and there is no intervening clock cycle between the first and second clock cycles.

12. The method of claim 11, wherein the register file read stage includes a register RA, wherein the register RA is coupled to an ALU (Arithmetic Logic Unit) in the execute stage, and wherein the data value that is loaded due to the carrying out of the load predicate bits instruction is a data value stored in the register RA.

13. The method of claim 11, wherein the register file read stage includes a register RA, wherein the register RA is coupled to an ALU (Arithmetic Logic Unit) in the execute stage, wherein the load predicate bits instruction includes a first code field, a second code field, and a data value field, wherein a value of the first code field indicates an amount of logic to be loaded or configured with the data value, wherein a value of the second code field indicates whether the data value is taken from the data value field of the load predicate bits instruction or whether the data value is taken from register RA.

14. The method of claim 10, wherein the skip instruction includes an opcode, and wherein the opcode determines a number of subsequent instructions to be skipped, wherein the number is one.

15. The method of claim 10, wherein the skip instruction includes an opcode, and wherein the opcode determines a number of subsequent instructions to be skipped, wherein the number is more than one.

16. The method of claim 10, wherein the register file read stage further comprises a register file, and wherein a result value output by the execute stage due to processing of the second instruction is not stored in the register file if the second instruction is not carried out whereas the result value output by the execute stage due to processing of the second instruction is stored in the register file if the second instruction is carried out.

17. The method of claim 10, wherein the skip instruction does not explicitly specify the predicate condition.

18. The method of claim 10, wherein the skip instruction does not include a data value to be loaded into the predicate bits as a result of execution of the skip instruction.

19. An apparatus for interfacing to a memory system, comprising:

a memory interface port; and means for:

(a) causing a sequence of instructions to be fetched from the memory system, wherein the sequence of instructions includes a first instruction and a second instruction, wherein the causing of (a) is performed by a fetch stage;

(b) decoding the first instruction and then decoding the second instruction, wherein the decoding of (b) is performed by a decode stage, and wherein the decode stage can decode skip instructions;

(c) maintaining a plurality of flag bits and a plurality of predicate bits in a register file read stage; and (d) carrying out an instruction operation of an instruction in an execute stage, wherein the second instruction defines an instruction operation to be performed when the second instruction is executed by the processor, wherein if the first instruction is a skip instruction and if a predicate condition is satisfied then the instruction operation of the second instruction is not carried out by the execute stage even though the second instruction was decoded by the decode stage, wherein the predicate condition for the skip instruction is specified by values of the predicate bits, and wherein the predicate condition is a specified function of values of at least one of the plurality of flag bits.

20. The apparatus of claim 19, wherein means is a pipeline of a processor, and wherein the decode stage, the register file read stage, and the execute stage are parts of the means.

\* \* \* \* \*